(12) United States Patent
Kiest, Jr. et al.

(10) Patent No.: US 10,024,481 B2
(45) Date of Patent: *Jul. 17, 2018

(54) METHOD AND APPARATUS FOR LINING A PIPE

(71) Applicant: LMK Technologies, LLC, Ottawa, IL (US)

(72) Inventors: Larry W. Kiest, Jr., Ottawa, IL (US); John Rinehart, Fort Lauderdale, FL (US); Jason M. Mathey, Oglesby, IL (US); Dan Engel, Peru, IL (US); Daniel L. Read, Marseilles, IL (US); Pete Dannenberg, Sandwich, IL (US)

(73) Assignee: LMK Technologies, LLC, Ottawa, IL (US)

( * ) Notice: Subject to any disclaimer, the term of this patent is extended or adjusted under 35 U.S.C. 154(b) by 485 days.

This patent is subject to a terminal disclaimer.

(21) Appl. No.: 14/590,760

(22) Filed: Jan. 6, 2015

(65) Prior Publication Data

US 2015/0192237 A1 Jul. 9, 2015

Related U.S. Application Data

(60) Provisional application No. 61/923,814, filed on Jan. 6, 2014, provisional application No. 61/926,493, filed on Jan. 13, 2014.

(51) Int. Cl.
| | |
|---|---|
| *F16L 55/16* | (2006.01) |
| *F16L 55/165* | (2006.01) |
| *F16L 55/179* | (2006.01) |

(52) U.S. Cl.
CPC ....... *F16L 55/1651* (2013.01); *F16L 55/1654* (2013.01); *F16L 55/179* (2013.01)

(58) Field of Classification Search
CPC ..................................................... F16L 55/179
(Continued)

(56) References Cited

U.S. PATENT DOCUMENTS

| 4,581,085 A | 4/1986 | Wood |
|---|---|---|
| 5,329,063 A | 12/1994 | Endoh |

(Continued)

FOREIGN PATENT DOCUMENTS

| DE | 10316161 | 4/2004 |
|---|---|---|
| DE | 102011013597 | 9/2012 |

(Continued)

OTHER PUBLICATIONS

Written Opinion for International (PCT) Patent Application No. PCT/US2015/010342, dated May 11, 2015.

*Primary Examiner* — James Hook
(74) *Attorney, Agent, or Firm* — Nyemaster Goode, PC

(57) ABSTRACT

A repair assembly and method of use is provided. The repair assembly includes a liner assembly for repairing a pipe system including a first pipe, a second pipe extending from the first pipe, and in some embodiments a third pipe extending from the second pipe. The third pipe may include multiple pipes. The repair assembly further includes a bladder assembly. The liner and bladder assembly are configured to work together to be positioned within the first, second, third and any additional pipes to line and repair all of the components of the pipe system in a single repair. Such repair will reduce the amount of time required to repair such pipe systems, and will increase the efficiency of repairing pipes.

26 Claims, 16 Drawing Sheets

(58) Field of Classification Search
USPC .................. 138/97, 98; 405/150.1, 184.2
See application file for complete search history.

(56) References Cited

U.S. PATENT DOCUMENTS

| | | | |
|---|---|---|---|
| 5,624,629 A | 4/1997 | Wood | |
| 5,632,952 A * | 5/1997 | Mandich | F16L 55/179 138/97 |
| 5,765,597 A * | 6/1998 | Kiest, Jr. | B29C 63/36 138/97 |
| 5,794,663 A * | 8/1998 | Kiest, Jr. | B29C 63/36 138/97 |
| 5,927,341 A | 7/1999 | Taylor | |
| 5,950,682 A | 9/1999 | Kiest | |
| 5,964,249 A * | 10/1999 | Kiest, Jr. | B29C 63/0095 138/97 |
| 5,964,288 A * | 10/1999 | Leighton | E21B 23/03 166/207 |
| 6,021,815 A | 2/2000 | Kiest, Jr. | |
| 6,039,079 A | 3/2000 | Kiest | |
| 6,105,619 A | 8/2000 | Kiest | |
| 6,146,491 A * | 11/2000 | Wood | F16L 55/1651 138/97 |
| 6,253,846 B1 | 7/2001 | Nazzai et al. | |
| 6,337,114 B1 | 1/2002 | Wood | |
| 6,401,815 B1 * | 6/2002 | Surjaatmadja | E21B 41/0042 138/98 |
| 6,416,692 B1 * | 7/2002 | Iwasaki-Higbee | F16L 55/164 138/97 |
| 7,343,937 B2 | 3/2008 | Kiest | |
| 7,448,413 B2 | 11/2008 | Kiest | |
| 7,588,055 B2 | 9/2009 | Kiest | |
| 7,628,177 B2 | 12/2009 | Lepola | |
| 7,753,081 B2 | 7/2010 | Kiest | |
| 8,739,809 B2 | 6/2014 | Kiest | |
| 8,869,839 B1 * | 10/2014 | D'Hulster | F16L 55/1651 138/97 |
| 9,423,064 B2 * | 8/2016 | Mathey | F16L 55/18 |
| 2006/0243337 A1 * | 11/2006 | Manners | F16L 55/1654 138/98 |
| 2007/0240779 A1 * | 10/2007 | Kamiyama | F16L 55/179 138/98 |
| 2009/0183794 A1 * | 7/2009 | Kamiyama | F16L 55/179 138/98 |
| 2012/0006440 A1 | 1/2012 | Kiest | |
| 2012/0175004 A1 | 7/2012 | Kiest | |

FOREIGN PATENT DOCUMENTS

| | | |
|---|---|---|
| EP | 0518521 | 12/1992 |
| EP | 1132568 | 9/2001 |
| EP | 1447610 | 8/2004 |
| WO | 2000004318 | 1/2000 |

\* cited by examiner

METHOD AND APPARATUS FOR LINING A PIPE

FIELD OF THE INVENTION

The present invention relates generally to pipe repair. More particularly, but not exclusively, the invention relates to a method and apparatus for repairing pipes that may include the repair of a main pipe, lateral pipe, and supplemental pipes extending off the lateral pipe.

BACKGROUND OF THE INVENTION

Prior methods for repairing damaged portions of pipelines include moving a liner tube impregnated with a liquid material capable of curing and hardening to a position within the pipe where the damaged portion is located. The liner tube is installed by pulling, pushing, or inverting the liner into the host pipe. Once the liner is positioned within the host pipe, it is pressurized, usually by an inflation bladder, causing the liner to press against the interior wall of the host pipe, and the liner is cured by applying heat, such as steam or hot water. These liners can also be cured at ambient temperatures by chemical mixtures that generate an exothermic reaction, the use of ultraviolet light or other photo curing initiators, or by electron beam curing. The liner tube forms an interior liner in the pipe for the pipeline being repaired. One such process is known as cured-in-place pipelining.

In most pipelines, lateral or branch pipes are connected to main pipes. In most cases, the lateral pipe connects to a main pipe by use of a factory made WYE or TEE-shaped fitting. However, in some cases the connection of a lateral pipe to a main sewer pipe is accomplished by forming a hole in the main line with a hammer. The lateral pipe is then simply abutted against the hole, and then the juncture is covered with mortar, dirt, or the like. Damage or leaking can occur at the junction between the lateral pipe and the main pipe, which is generally known as one of the weakest points in a collection sewer system. T-shaped or Y-shaped liner tubes have been utilized to fit within the junction between the lateral and main pipes. Liner tubes form a T-shaped or Y-shaped liner after hardening to the interior of the junction between the pipes. Again, inflation bladders are typically used to pressurize the liners against the interior walls of the host pipes.

Furthermore, some pipelines include additional pipes that extend off or from the lateral pipes. These supplemental pipelines, which may be lateral pipes or clean out pipes, may extend in a number of manners from the lateral pipe to service multiple buildings or drain lines. For example, a pipeline may exist at a distal end of the lateral pipe away from the main pipe, extending in opposite directions. This pipe may have an axis that is substantially parallel to the axis of the main pipe, or may have an axis in any angle relative to the axis of the main pipe. For example, the lateral connects from the main at a 12:00 location and extends to a bullheaded TEE fitting. The two branch pipes continue in two opposite directions from the mainline direction.

However, present pipe repair assemblies are not configured to repair these configurations of pipelines. Instead, while a main pipe, a lateral pipe, and the main/lateral connection may be repaired at the same time, a separate assembly will be needed to repair the additional or supplemental pipeline, or even the bullheaded TEE fitting. This increases the amount of time it takes to repair the pipes and does not renew the bullheaded TEE where leakage can continue to occur. The only solution has heretofore been to excavate the bullheaded TEE fitting. The resulting delay of this approach can increase the amount of money it takes to repair the pipes, as the process will need to take longer and likely utilize additional equipment and restoration to road pavement. Furthermore, there is no continuous liner for the sections, so there is no homogenous repair without cold joints.

Sewer clean out pipes or access pipes are often found along a lateral sewer pipe. A sewer clean out pipe is normally a capped pipe which provides access from the ground level to the sewer line. A lateral clean out pipe allows the cleaning of blockages in the lateral sewer pipe. The lateral clean out is also a point of entry for cured-in-place pipelining applications as disclosed in U.S. Pat. No. 7,343,937 which is incorporated by reference. In some instances, the pipe in need of repair may include not only the lateral pipe but the clean out pipe as well. However, pipe repair assemblies are not presently configured to line a lateral pipe on both sides of the sewer clean out when the clean out is the access point for the repair. Nor do pipe repair assemblies and lining methods exist for lining through a clean out to repair both the downstream portion of the lateral pipe and the junction between the main and lateral pipe. Similarly, using a clean out to rehabilitate a lateral pipe and a supplemental pipe in communication therewith is also problematic.

Therefore, there is a need in the art for a pipe repair assembly that is able to repair more pipes with a single assembly that has been previously made to match the configuration of the multiple pipes. There is also a need in the art for an assembly and method of repair that reduces the amount of time it takes to repair a pipe system having one or more pipes extending from a lateral pipeline.

SUMMARY OF THE INVENTION

Therefore, it is a principal object, feature, and/or advantage of the present invention to provide an apparatus that overcomes the deficiencies in the art.

It is another object, feature, and/or advantage of the present invention to provide a repair assembly that allows for the repair of the main pipe, lateral pipe extending from a main pipe, and a supplemental pipe extending from the lateral pipe.

It is still another object, feature, and/or advantage of the present invention to provide a repair assembly that can repair multiple junctures between pipelines.

It is another object, feature, and/or advantage of the present invention to provide a repair assembly for use in repairing a lateral pipe and a supplemental pipe and/or main pipe from a sewer clean out.

It is yet another object, feature, and/or advantage of the present invention to provide a repair assembly that includes a bladder assembly capable of expanding liners in a main pipe, lateral pipe, and supplemental pipe.

It is a further object, feature, and/or advantage of the present invention to provide a liner assembly capable of repairing a main pipe, lateral pipe, supplemental pipe, and connections between the pipes.

It is a further object, feature, and/or advantage of the present invention to provide a repair assembly and pipelining method for repairing a sewer clean out in addition to the upstream and downstream portions of the lateral pipe connected thereto.

It is still a further object, feature, and/or advantage of the present invention to reduce the amount of time it takes to repair multiple pipelines.

It is still a further object, feature, and/or advantage to seal the pipes preventing leakage by use of gasket end seals attached to the liner prior to insertion of the liner into the pipe.

It is still a further object, feature, and/or advantage to measure diameters, angles, and lengths of multiple pipelines through non-invasive methods and to manufacture a liner assembly that matches the size and configuration of a main pipe, a lateral pipe and multiple branch pipes.

These and/or other objects, features, and advantages of the present invention will be apparent to those skilled in the art. The present invention is not to be limited to or by these objects, features and advantages. No single embodiment need provide each and every object, feature, or advantage.

Accordingly, one aspect of the present invention includes a repair assembly capable of repairing a pipe system including a first pipe, a second pipe extending from the first pipe at a first junction, and a third pipe extending from the second pipe at a second junction. The first pipe may also be referred to as a main pipe, the second pipe a first lateral pipe, and the third pipe a branch pipe or supplemental pipe. The third pipe may extend from the second pipe in a number of configurations. For example, the third pipe may extend from a distal end of the second pipe in an orthogonal direction, with the axis of the third pipe being substantially perpendicular to the axis of the second pipe, and extending in opposite directions therefrom. The third pipe may only extend in a single direction from the second pipe as well. Furthermore, the invention contemplates that the third pipe may extend from the second pipe at a location between the first pipe and the distal end of the second pipe, with generally any number of third pipes extending from the second pipe.

The repair assembly thus includes a liner assembly. The liner assembly, according to some embodiments, includes a main liner member for positioning in a main pipe, a lateral liner tube extending from the main liner member and configured to line a lateral pipe extending from the main pipe, and at least two supplemental liner tubes extending from the lateral liner tube and configured to line at least a portion of the supplemental pipes extending from a lateral pipe. The main liner member can be pulled into place and inflated so the lateral liner is aligned to extend into the lateral pipe; or the main liner can be pulled in and inverted so the lateral liner is aligned to extend into the lateral pipe. The mainline liner may be a brim style flange or a full wrap for the pull in and inflate method. However, if the mainline liner is pulled in and inverted, the mainline liner must be formed as a tube. The lateral liner tube may extend from the main liner member in a tee or wye shaped configuration. The supplemental liner tubes may be positioned in a tee or wye shaped configuration at the distal end of the lateral liner tube away from the main liner tube. Such a configuration would allow the liner assembly to repair a pipe system in which the lateral pipe extends at a tee or wye angle from the main pipe, and also in which the supplemental pipe extends from the lateral pipe in a tee or wye configuration. For example, the liner assembly may be configured to repair and line a pipe system in which the lateral pipe extends substantially perpendicular (tee configuration) from the main pipe, and which the supplemental pipe extends in a substantially perpendicular manner (tee shape) from a distal end of the lateral pipe. In such a situation, the lateral liner would be a tee-shaped liner, and the supplemental liner would also be a tee-shaped liner. However, the invention contemplates that either or both of the lateral and supplemental liners may extend in a wye-shaped configuration, in which the axis of the lateral and/or supplemental liners are acute or obtuse to one another and/or the main liner axis.

The liners, which can comprise a resin absorbent material, may be impregnated with a material capable of curing and hardening prior to positioning within the pipe system. The liner assembly is inverted into position such that the liners of the assembly are positioned in their respective pipes to be repaired. Bladders may be used to press the liners into contact with the pipes, such that the material impregnated in the liners cures and hardens to form a repaired pipe wall. Furthermore, compression gaskets may be used to form an end seal at terminating ends of the liner, likewise a collar may be positioned on the assembly and configured to be positioned at either or both of the junctions between the main pipe and the lateral pipe, and the lateral pipe and the supplemental pipe. The collar, which can comprise a hydrophilic rubber, polymer, or other water-sealing material, aids in sealing the junctions between the pipes.

According to other aspects of the invention, a method of repairing a pipe is provided. The method includes providing a liner assembly comprising a main liner member, a lateral liner tube extending from the main liner member, and at least one supplemental liner tube extending from the lateral liner tube and configured to line at least a portion of a supplemental pipe extending from a lateral pipe. The liner assembly is impregnated with a material capable of curing and hardening, and positioned in a pipe system. The liner assembly is expanded such that the lateral liner tube extends into and in contact with a lateral pipe and such that the at least one supplemental lateral pipe extends into and in contact with a supplemental pipe. The material is allowed to cure and harden. A bladder assembly, comprising a main bladder tube, a lateral bladder tube extending from the main bladder tube, and at least one supplement bladder tube extending from the lateral bladder tube, may be used to expand the liner assembly in the pipe system.

According to additional aspects of the invention, a repair assembly is provided. The repair assembly includes a bladder assembly comprising a main bladder tube, a lateral bladder tube extending from the main bladder tube, and at least one supplemental bladder tube extending from the lateral bladder tube, and a liner assembly comprising a main liner member, a lateral liner tube extending from the main liner member, and at least one supplemental liner tube extending from the lateral liner tube and configured to line at least a portion of a supplemental pipe extending from a lateral pipe. The main liner member at least partially surrounds the main bladder member, the lateral liner tube is configured to be positioned between the lateral bladder tube and a lateral pipe, and the at least one supplemental liner tube is configured to be positioned between the at least one supplemental bladder tube and a supplemental pipe. At least a portion of the liner assembly comprises a resin absorbent material. The liners can be ambient cured or steam cured by passing steam through the bladder and out the end of the bladder through an exhaust hole in the bladder. The repair assembly may also include a launcher device, wherein the main bladder member at least partially surrounds the launcher device and the launcher device is used to position the repair assembly. The launcher device is fluidly connected to the bladder assembly such that the launcher device provides a fluid to the bladder assembly to inflate and expand said bladder assembly to expand the liner assembly. Furthermore, the repair assembly may include a collar positioned at a juncture of the main liner member and the lateral liner tube such that the collar is configured to be located at least partially between the main liner member and a main pipe. The collar may comprise a water sealing material, such as a hydrophilic or hydrophobic material. The collar may also gasket made of compressible material like rubber or silicone. The process of the invention can also be completed through inversion for all portions of the liner assembly, including the main, the lateral, and the branches, which are all inverted out of a lay flat hose launcher without the use of a more rigid T-Launcher. When a T-Launcher is used, the main bladder is inflated causing the main member to contact the pipe. This is just a different method for installing the liner assembly but in the case of the rigid T-Launcher, the main liner is made from a flat sheet that is wrapped, and in the case of inversion, the main liner is a preformed tube that can be inverted.

Another aspect of the present invention includes a repair assembly and method for lining through a clean out to repair at least a portion of the clean out pipe and a connecting pipe, such as a lateral pipe. The repair assembly generally includes a bladder assembly including an access bladder tube and a lateral bladder tube extending from the access bladder tube, a liner assembly including an access liner tube configured to line at least a portion of the access pipe and a lateral liner tube extending from the access liner tube and configured to line at least a portion of the lateral pipe in a first direction away from the access pipe and a second direction away from the access pipe. The access liner tube is configured to be positioned between the access bladder tube and the access pipe, and the lateral liner tube is configured to be positioned between the lateral bladder tube and the lateral pipe.

Another aspect of the present invention includes a repair assembly and method for lining through a clean out to repair at least a portion of a lateral pipe and a connecting pipe, such as another lateral pipe or a main pipe. The repair assembly generally includes a bladder assembly including an access bladder tube, a lateral bladder tube extending from the access bladder tube, and a main bladder tube extending from the lateral bladder tube, and a liner assembly including a lateral liner tube configured to line at least a portion of the lateral pipe and a main liner tube configured to line at least a portion of the main pipe. The lateral liner tube is configured to be positioned between the lateral bladder tube and the lateral pipe, and the main liner tube is configured to be positioned between the main bladder tube and the main pipe.

Another aspect of the present invention includes a repair assembly and method for lining through a clean out to repair at least a portion of a lateral pipe on opposite sides of the clean out and a connecting pipe, such as another lateral pipe or a main pipe. The repair assembly generally includes a bladder assembly including an access bladder tube, a lateral bladder tube extending from the access bladder tube, and a main bladder tube extending from the lateral bladder tube, wherein the lateral bladder tube has a first portion configured to extend in a first direction and a second portion configured to extend in a second direction, and a liner assembly including a lateral liner tube configured to line at least a portion of the lateral pipe and a main liner tube configured to line at least a portion of the main pipe, wherein the lateral liner tube has a first portion configured to extend in a first direction and a second portion configured to extend in a second direction. The lateral liner tube is configured to be positioned between the lateral bladder tube and the lateral pipe, and the main liner tube is configured to be positioned between the main bladder tube and the main pipe.

Figure 1:
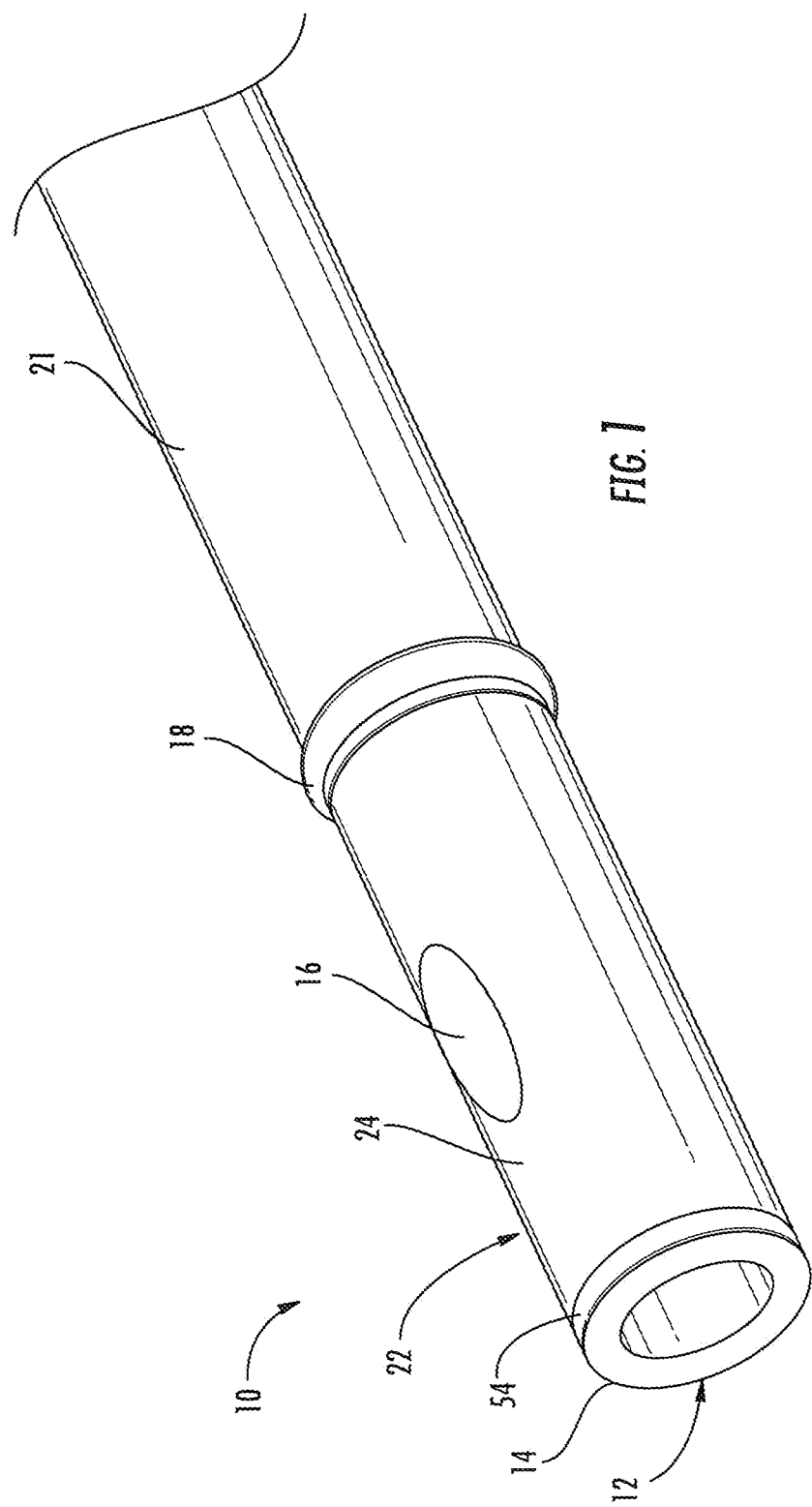
FIG. 1 is a perspective view of an embodiment of a repair assembly for repairing a pipe system.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The present invention relates generally to the repair of pipe systems. The pipe systems may be a sewage pipe system. Some pipe systems include a pipe, which is also known as a main pipe. A lateral pipe extends from portions of main pipes. At times, these lateral pipes extend from the main pipe to a residence or business. At a distal end of a lateral pipe away from a main pipe, supplemental pipes may extend. For example, the supplemental pipes may extend from opposite directions at the distal end of the lateral pipe into residences on opposite sides of a road or other structure. In addition, a supplemental pipe may extend from different locations along the length of the lateral pipe and towards other structures, residences, businesses, or other pipes.

The supplemental pipe may extend along generally any configuration from the lateral pipe, which is also extending from any configuration from the main pipe. For example, the lateral pipe may extend from the main pipe in a tee or wye configuration, wherein the tee and wye configurations relate generally to the angle of the lateral pipe extending from the main pipe. Likewise, the supplemental pipe may include one or more sections that extend from the lateral pipe in a tee or wye configuration. In some instances, the supplemental pipe extends from the distal end of the lateral pipe in a tee configuration with the axis of the supplemental pipe being generally perpendicular to the axis of the lateral pipe from which it extends. It should further be appreciated that the axis of the supplemental pipe may be substantially parallel to that of the main pipe, or may be configured in such a manner that it is perpendicular, obtuse, or otherwise angled with relation to the axis of the main pipe. However, in any case or configuration of pipe system, the pipes and junctures between said pipes may need to be repaired.

One specific type of supplemental pipe is a clean out. Clean outs (also referred to herein as clean out pipes or access pipes) provide access to the pipe system. A lateral clean out in a sewer pipe system extends from a lateral pipe to the ground level. The lateral clean out provides an access point for rehabilitating the lateral pipe. The clean out pipe may also be in need of repair.

One exemplary form of the present invention provides a novel repair assembly 10 and method of use for repairing pipe systems that include a first pipe (main pipe), second pipe extending from the main pipe (lateral pipe), as well as a third or even fourth pipe extending from a portion of the second pipe (supplemental pipe). It should be noted that, while the repair assembly 10 shown and described is shown to repair a pipe system including a third, fourth, or otherwise supplemental pipe extending at a distal end of said second or lateral pipe, it should be appreciated that this is for exemplary purposes only. The repair assembly 10 can be manipulated or otherwise configured to repair generally any pipe system including a third or supplemental pipe extending from a portion of a lateral or second pipe.

Figure 2:
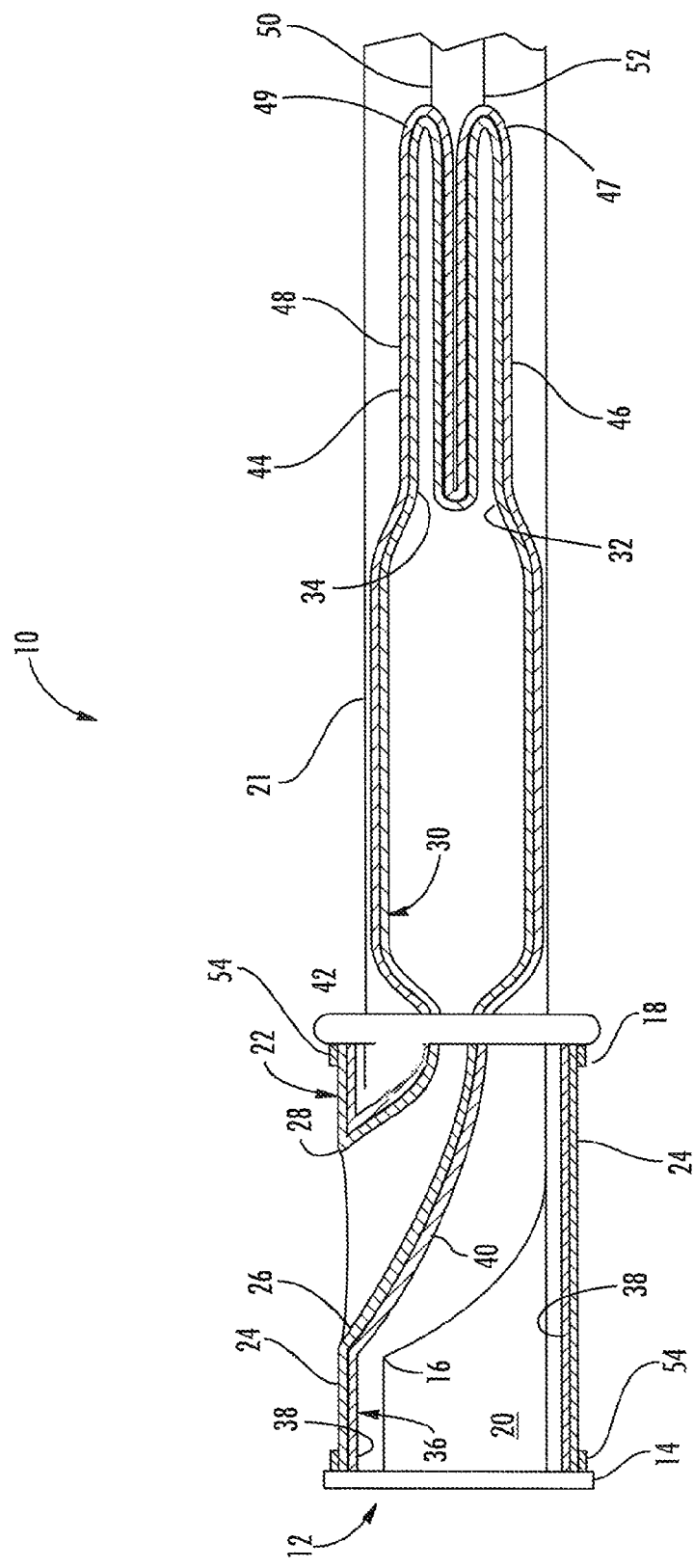
FIG. 2 is a side sectional view of the repair assembly of FIG. 1.

FIG. 1 is a perspective view of a repair assembly 10 for repairing such a pipe system. The repair assembly 10 shown in FIG. 1 includes a launcher device 12, which is used to position the repair assembly within the pipe system, and to aid in positioning the components of the repair assembly 10 into the various pipes of the system. The launcher device 12 includes a first end 14 and an opposite end 18. Between the first and second ends 14, 18 is a launcher device opening 16, which provides access to a cavity 20 within the launcher device 12. As shown throughout the figures, a lay flat hose 21 is fluidly connected to the second end 18 of the launcher device 12. The lay flat hose 21, which is not required in all embodiments, provides for the storage, positioning, and application of fluid to an extended portion of the repair assembly 10, as will be appreciated and understood. It should also be appreciated that when shorter portions of a pipe system are to be repaired using the repair assembly 10 of the invention, the lay flat hose 21 may not be needed, as there will not be as long of components of the repair assembly to be positioned within the pipe system. As shown in FIGS. 1 and 2, a liner assembly 22 is included with the repair assembly 10 and operably connected to said launcher device 12. The liner assembly 22 includes a main liner member 24, which at least partially surrounds a portion of the launcher device 12. The main liner member 24 may comprise a tube, formed from abutting edges of a sheet of material that then may be stitched, or the sheet of material may be wrapped about the launcher device 12 with opposing edges overlapping. Connected to the main liner member and extending within the launcher device 12 in FIGS. 1 and 2 is a lateral liner tube 26. The lateral liner tube 26 extends from the main liner member 24 about a main liner member opening 28. Thus, the lateral and main liners may be fluidly connected to one another, but may comprise separate pieces, which are attached to one another. As shown in FIG. 2, the lateral liner tube 26 extends through the launcher device opening 16 and into the cavity 20 of the launcher device 12. The lateral liner tube 26 further extends into the lay flat hose 21. As the lateral liner tube 26 is inverted or pulled into the launcher device 12 and the lay flat hose 21, the assembly 10 is shown to be a cured in place pipe lining or inversion method style of pipe repair. As will be understood, in such an assembly, the launcher device 12 is moved into position such that the lateral liner tube 26 is everted through the launcher device opening 16 and into a lateral pipe, where it is put into contact with the walls of a lateral pipe. While such a configuration is shown, it should be further appreciated that the repair assembly 10 of the present invention may also be the type of pipe repair does not limit the repair assembly 10 in any way.

The liner assembly 22 further includes a supplemental liner tube 30 extending from a portion of the lateral liner tube 26 and in fluid communication with said lateral liner tube 26. As shown in the figures, the supplemental liner tube 30 includes first and second sections 32, 34, which extend from a distal end of the lateral liner tube 26. Therefore, the configuration of the liner assembly 22 shown in the figures is configured to line a supplemental pipes positioned at a distal end of the lateral pipe of the pipe system. However, as will be understood, the location and configuration of the supplemental liner tubes 30 may be positioned generally anywhere along the body of the lateral liner tube such that it may be positioned into a supplemental pipe extending at any location along the lateral pipe of the pipe system being repaired.

The components of the liner assembly 22 may comprise a resin absorbent material, such as a felt material. However, in some configurations, only certain or some components of the liner assembly may include a resin absorbent material. For example, it is contemplated in some embodiments that the main liner member may also include a rubber gasket, or a sealant material, such as a cured or uncured hydrophilic material. Furthermore, it is contemplated in some embodiments that the liner assembly 22 includes elastic, hydrophilic, and/or other types of bands positioned surrounding the main liner member of the repair assembly on opposite sides of the main liner member opening 28, and at the distal ends of the supplemental liner tubes. The bands may aid in providing sealing for the opposite sides of the pipe juncture being prepared and the terminating ends of the supplemental liner tubes. Furthermore, additional bands may be included in the liner assembly 22 within the lateral liner tube 26, as well as the first and second sections 32, 34 of the supplemental liner tube 30. The positioning and use of the bands would provide for additional sealing throughout the repair of the pipe system by the repair assembly 10 of the invention.

Also included in the repair assembly 10 of the present invention is a bladder assembly 36. The bladder assembly 36 is configured to expand under the presence of a fluid, such as air, steam, water, or other fluid. The expansion of the bladder assembly 36 presses the components of the liner assembly 22 into position against the walls of the various pipes of the pipe system, and holds the liner assembly in place until a material capable of curing hardening cures and hardens. Once the material has cured and hardened, the bladder assembly 36 may be removed from the pipe system to leave the cured liners in place forming the new pipe wall. However, it is to be appreciated that in some embodiments, the bladder assembly 36 will remain in the pipe system, with access provided thereto, wherein the components of the bladder assembly 36 form the interior walls of the repaired pipe system.

However, no bladder is required when the invention is practiced with the use of a parachute end or insertion of an inflatable plug inserted into the uppermost end or ends of the supplemental liners. In such a case, the parachute end or plug will be used to block the open ends of the liners, and the addition of a fluid within the liners will cause them to be positioned, either by expansion and stretching or just expansion, against the walls of the pipes. The plug or parachute can be maintained in place until such time that the curable material of the liners has cured and hardened.

The bladder assembly 36 includes a main bladder tube 38, which is positioned on and at least partially surrounding the launcher device 12 and between the launcher device 12 and the at least portion of the main liner member 24 of the liner assembly 22. As shown throughout the figures, the main bladder tube 38 is held in place on the launcher device 12 by the use of banding 54 on opposite ends of the launcher device 12. The banding 54 may take the form of clamps, tape, straps, or generally any other component capable of holding the main bladder tube 38 in place, while also providing a fluid tight seal at the location of the banding 54. Extending generally from a main bladder opening 42 is a lateral bladder tube 40. The lateral bladder tube 40 is fluidly connected to the main bladder tube 38 in some embodiments, however, in additional embodiments, it is contemplated that the lateral bladder tube 40 is independent of the main bladder tube 38 such that the inclusion of fluid into one does not expand the other. However, for exemplary purposes, the present invention shows and describes a bladder assembly 36 with the main bladder tube 38 and the lateral bladder tube 40 fluidly connected such that the inflation or inclusion of fluid into one will also cause expansion of the other.

Fluidly connected to a distal end of the lateral bladder tube 40 is a supplemental bladder tube 44, which may include a first section 46 and a second section 48. The first and second sections 46, 48 of the supplemental bladder tube 44 correspond to opposing portions of a supplemental pipe extending from a distal end of a lateral pipe. However, the number and configuration of the supplemental bladder tube 44 may take generally any form as required to repair it and line a pipe system. The first and second sections of the supplemental bladder tube 44 are separate from one another but fluidly connected to one another as well as to the lateral bladder tube 40. Furthermore, the first and second sections 46, 48 include a first closed end 47 and second closed end 49. The lateral bladder tube 40 and supplemental bladder are inserted through the launcher device opening 16 and into the lay flat hose 21, by pulling on the ropes 50, 52, as shown in FIG. 2. Thus, inclusion of a fluid into the lay flat hose 21 and launcher device 12 will cause the bladder assembly to begin to evert through the launcher device opening 16, contacting the pipe into and through the lateral pipe, and furthermore into the portions of the supplemental pipes. The eversion and expansion of the bladder assembly 36 will position the liner assembly 22 into its corresponding pipes to be repaired, and also into contact with the pipe walls.

Also shown in FIG. 2 are first and second lines 50, 52 attached to the ends 47, 49 of the supplemental bladder tube 44. The lines will extend through and out of the lay flat hose 21. As will be understood, when the bladder assembly 36 is to be removed after curing of the liner assembly 22, the lines may be pulled to detach the bladder assembly from the liner assembly, to leave only the liner assembly 22 within the pipe system.

Figure 3:
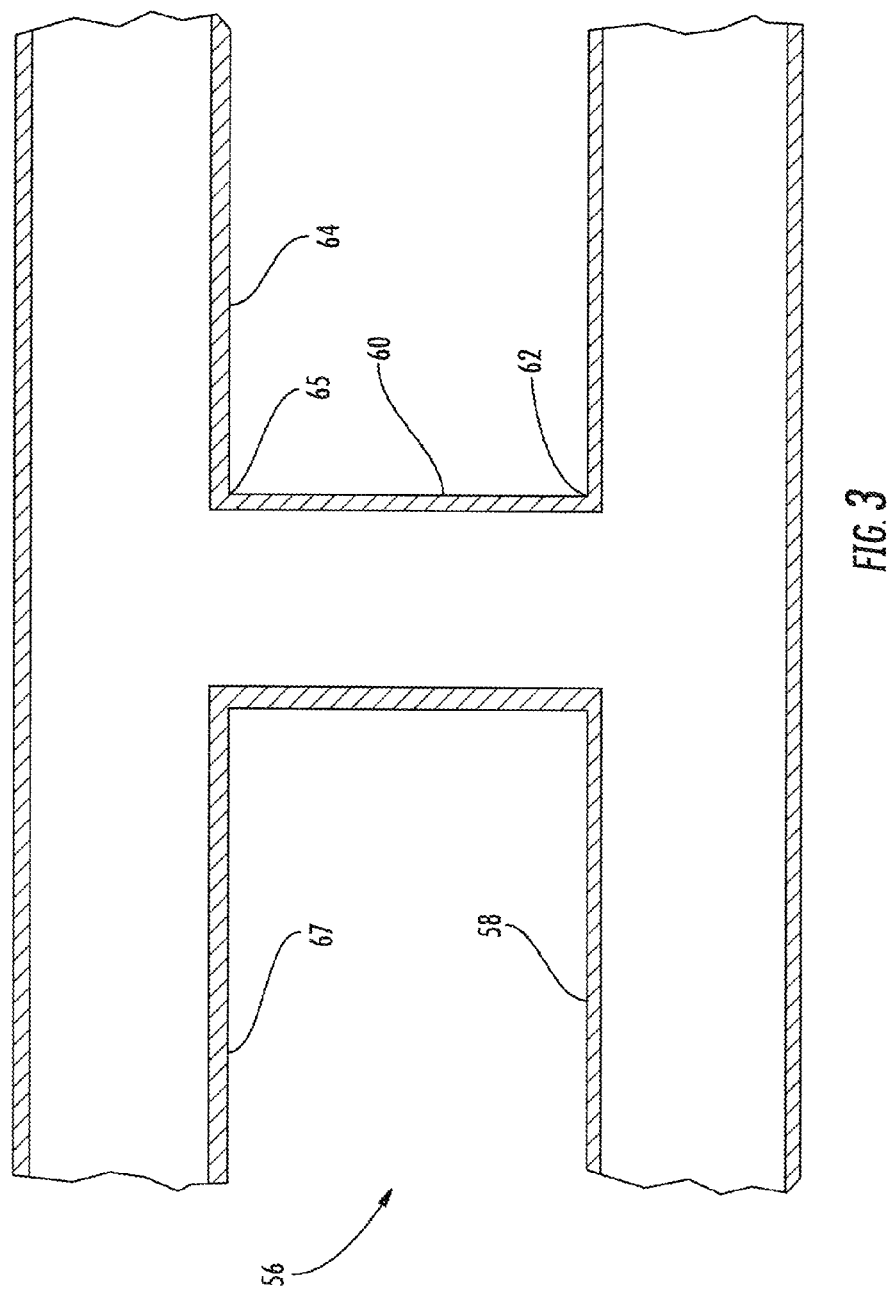
FIG. 3 is a sectional view of a pipe system.

FIG. 3 shows an exemplary pipe system 56, which may be prepared utilizing the repair assembly 10 of the present invention. The pipe system 56 shown in FIG. 3 includes a first or main pipe 58. Extending from the first or main pipe 58 is a second or lateral pipe 60. The main and lateral pipes are joined at a pipe juncture 62. At a distal end of the lateral pipe 60 extends a third, fourth, and/or otherwise supplemental pipes 64 which is formed at a juncture 65 between the lateral and supplemental pipes. The lateral pipe 60 of the pipe system 56 is shown to be a T-shaped pipe in relation to the main pipe 58. Thus, the axis of the lateral pipe 60 is substantially perpendicular to the axis of the main pipe 58. However, in some systems, the lateral pipe 60 will be angled such that it is Y-shaped relative to the main pipe 58. Likewise, the supplemental pipe 64 is shown to be T-shaped relative to the lateral pipe 60. However, the supplemental pipe 64 may also be angled such that it is Y-shaped relative to the lateral pipe 60. Furthermore, while the axis of the supplemental pipe 64 is shown to be substantially parallel to the axis of the main pipe 58, the repair assembly 10 of the invention is configured to be able to repair a supplemental pipe extending generally any direction relative to the main and lateral pipes 58, 60. For example, considering the main and lateral pipes in the same configuration as shown in FIG. 3, the repair assembly 10 of the invention may be configured to repair a supplemental pipe 64 which extends generally out of an into the page such that it is perpendicular to both the lateral and main pipe 60, 58. In addition, this is in addition to the contemplation of the supplemental pipe 64 being Y-shaped. Thus, the components of the repair assembly 10 may be configured to repair substantially any pipe system including components which are angled relative to one another in substantially any manner, and the repair assembly 10 of the invention is not to be limited to the exemplary embodiment shown in the figures and for the exemplary pipe system 56 of the figures. Furthermore, the supplemental pipes, 64, 67 may be smaller than the lateral pipe 60. For example, the main pipe 58 may be approximately 8-inches in diameter, the lateral pipe 60 6-inches in diameter, and the supplemental pipes 64, 67 4-inches in diameter. The invention will still be able to line the pipes having the different diameters.

The length of the lateral pipe, e.g., the distance between the main/lateral juncture 62 and the lateral/supplemental pipes juncture 65, can be measured in order to prepare the repair assembly 10 for use in a particular pipe system 56. This can be done in many ways, and will provide an assembly in which the supplemental pipe liners 32, 34 begin to extend from the lateral liner 26 at approximately the location of the juncture 65, such that the liners are positioned against the full interior of the supplemental pipes 64, 67 to be repaired. The measurements can be done in a number of ways, which are shown generally in FIGS. 11-13.

Figure 11:
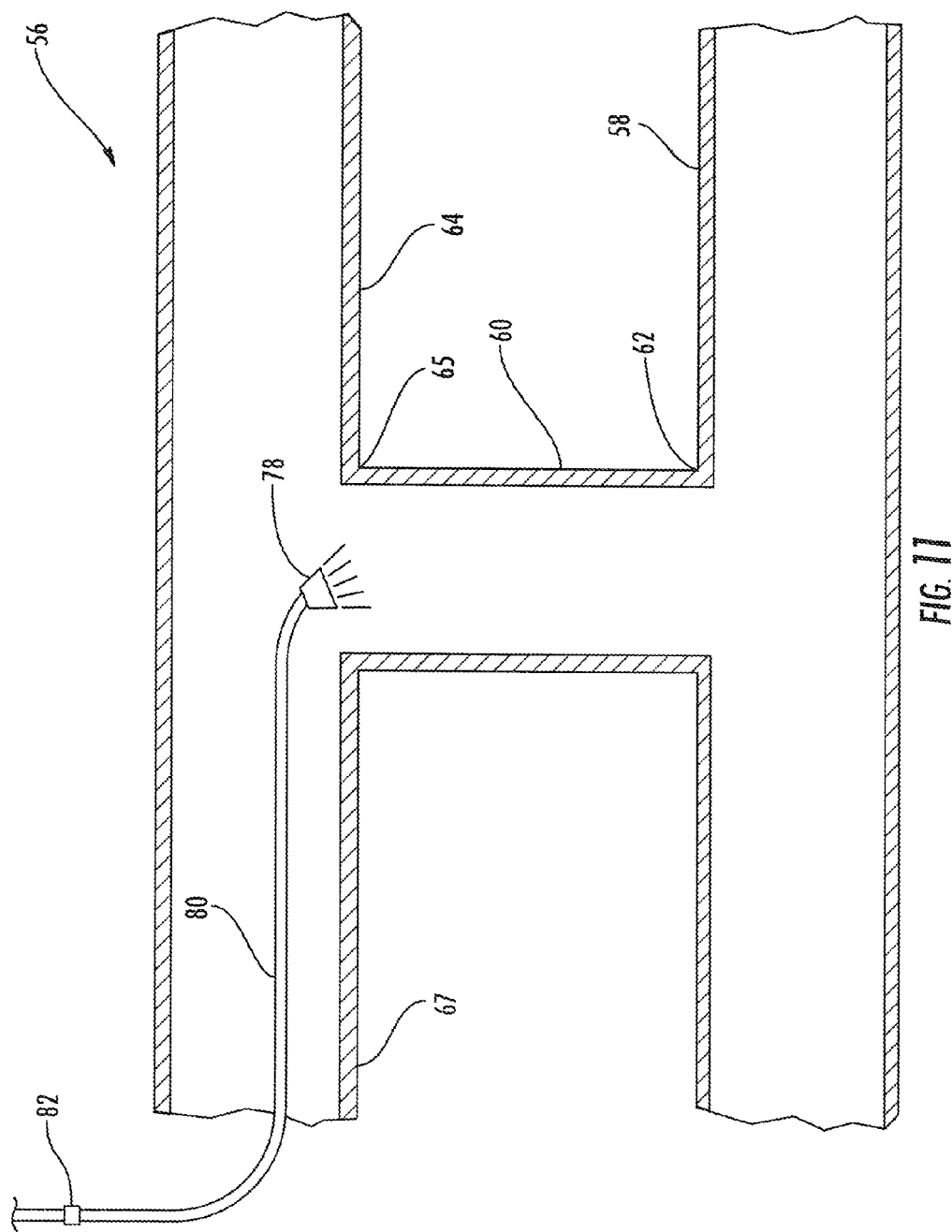
FIG. 11 is a view of a pipe system being measuring according to an exemplary method of the invention.
Figure 12:
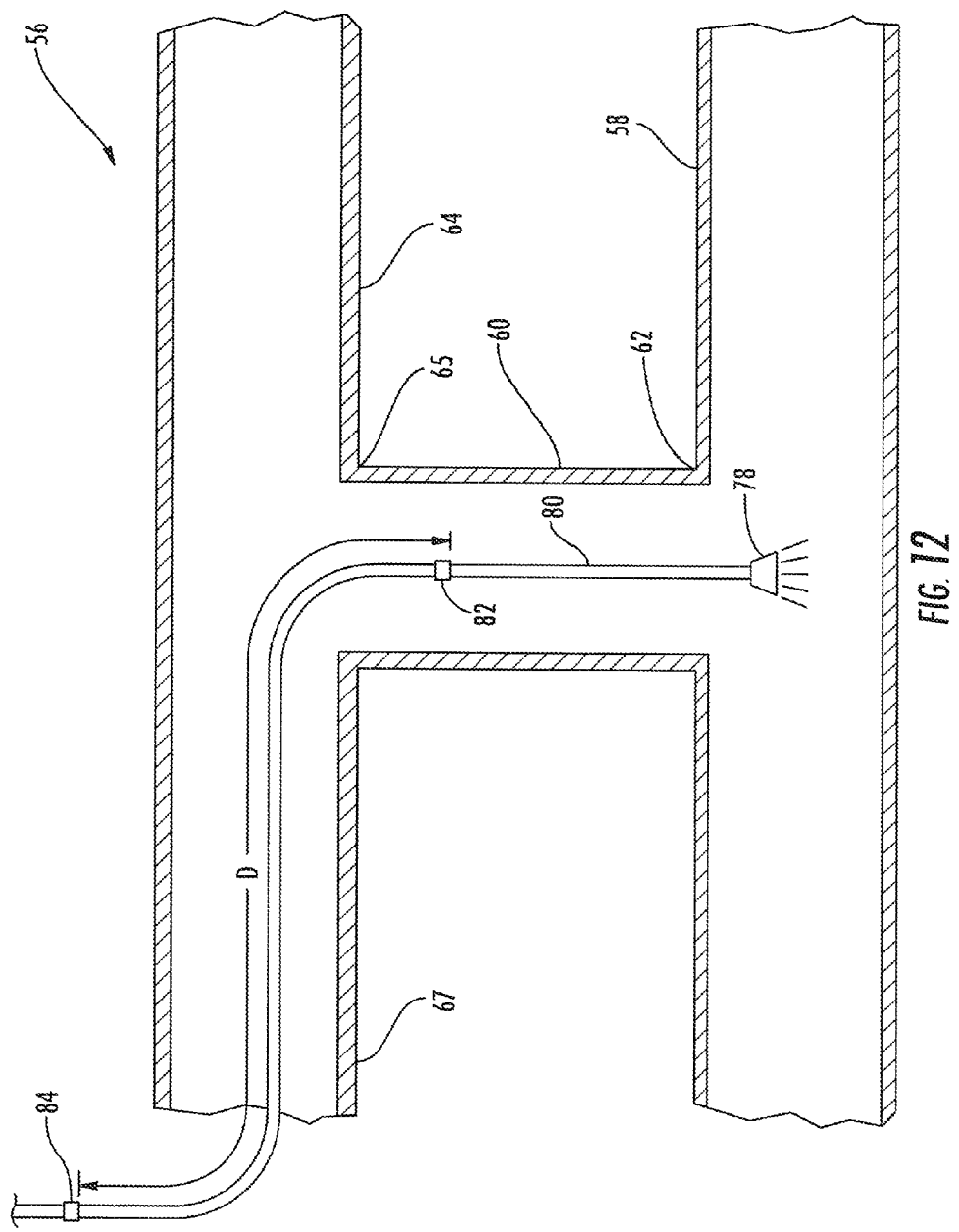
FIG. 12 is a view similar to FIG. 11 showing an exemplary method of measuring a pipe system.

FIGS. 11-12 disclose one way to measure the length of the lateral pipe 60. As shown in FIG. 11, a camera 78 positioned at the end of a hose or tube 80 can be positioned in either the main pipe 58 or one of the supplemental pipes 64, 67. The camera 78 is operatively connected to a viewing device, such as a screen. The screen can be viewed by an operator outside of the pipe system to view the location of the camera and hose as they are moved through a pipe or pipe system. The camera/hose is moved until it is positioned generally at one of the junctions. At this point, the hose 80 is marked, such as with a piece of tape or a marker 82. The camera 78 and hose 80 are moved through the lateral pipe 60 until it reaches the opposite juncture. At this point, the hose 80 is marked with a second mark 84. The assembly can then be removed from the pipe system 56. The hose is laid flat, and the length between the first and second marks 82, 84 is measured and shown with reference letter D in FIG. 12. This measurement should approximate the length of the lateral pipe 60, such that a lateral liner tube 26 can be prepared to the approximate length of the lateral pipe 60 with the main liner 24 and supplemental liners 32, 34 extending from opposite sides of the lateral liner 26.

Figure 13:
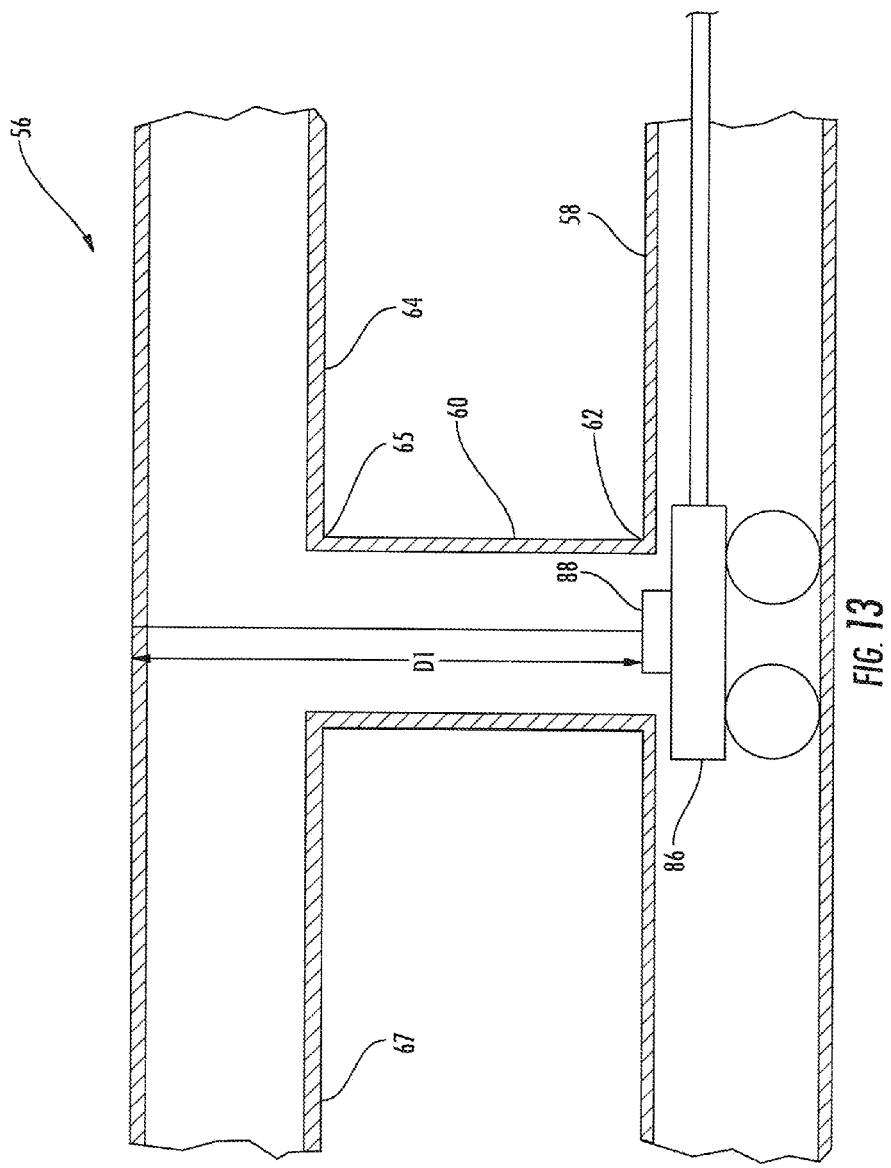
FIG. 13 is a view of another exemplary method of measuring a pipe system to be repaired.

Another exemplary method and apparatus for measuring the length of the lateral pipe 60 in order to prepare the repair assembly 10 is shown in FIG. 13. As shown in FIG. 13, a robot 86, which may be a positioning, cleaning, or generally any other type of robot, is used to move through either the main pipe 58 or one of the supplemental pipes 64, 67. Such a robot may be known in the industry, such as for cleaning, cutting, moving, or performing other jobs within a pipe or pipe system. Therefore, the operation and control of the robot 86 may be known. Operatively attached to the robot 86 is a measuring device 88. The measuring device 88 may be any mechanism capable of measuring, such as by the use of light, sound, wavelength, other time of flight mechanism, or even physical members. Examples of time of flight measuring devices include, but are not limited to, lasers, electronic distance meters, ultrasonic ranging module (sonar, echo sounding), and radar distance measurement devices, to name a few. The device 88 may be attached to the robot such that the device 88 can be aligned with a lateral pipe 60 from a location in either a main pipe 58 or one of the supplemental pipes 64, 67. The device can be oriented at one of the junctures 62, 65 between the pipes.

The robot 86 is moved through the pipe system to a location at a juncture between a pipe and a lateral pipe. The measuring device 88 is activated to accurately measure the distance D1 to the far end of the pipe intersecting the lateral pipe. Knowing the diameter of the pipes will allow an operator to quickly and easily determine the length of the lateral pipe 60. This will allow the operator to prepare the repair assembly to the configuration of the pipe system so that the lining members line the appropriate pipes. For example, when a laser measuring device is used, the laser can be activated to obtain the distance between it and the far end of the pipes. This measurement can be stored in the device 88, or it can be sent to another device, such as a computing device (phone, computer, tablet, receiver, etc.) outside the pipe and viewed by an operator, who can then prepare the repair assembly. The measuring laser device can be any device, such as one bought "off the shelf". The invention is not to be limited to specific types, brands, and/or models of devices, and any measuring device may be used.

Figure 4:
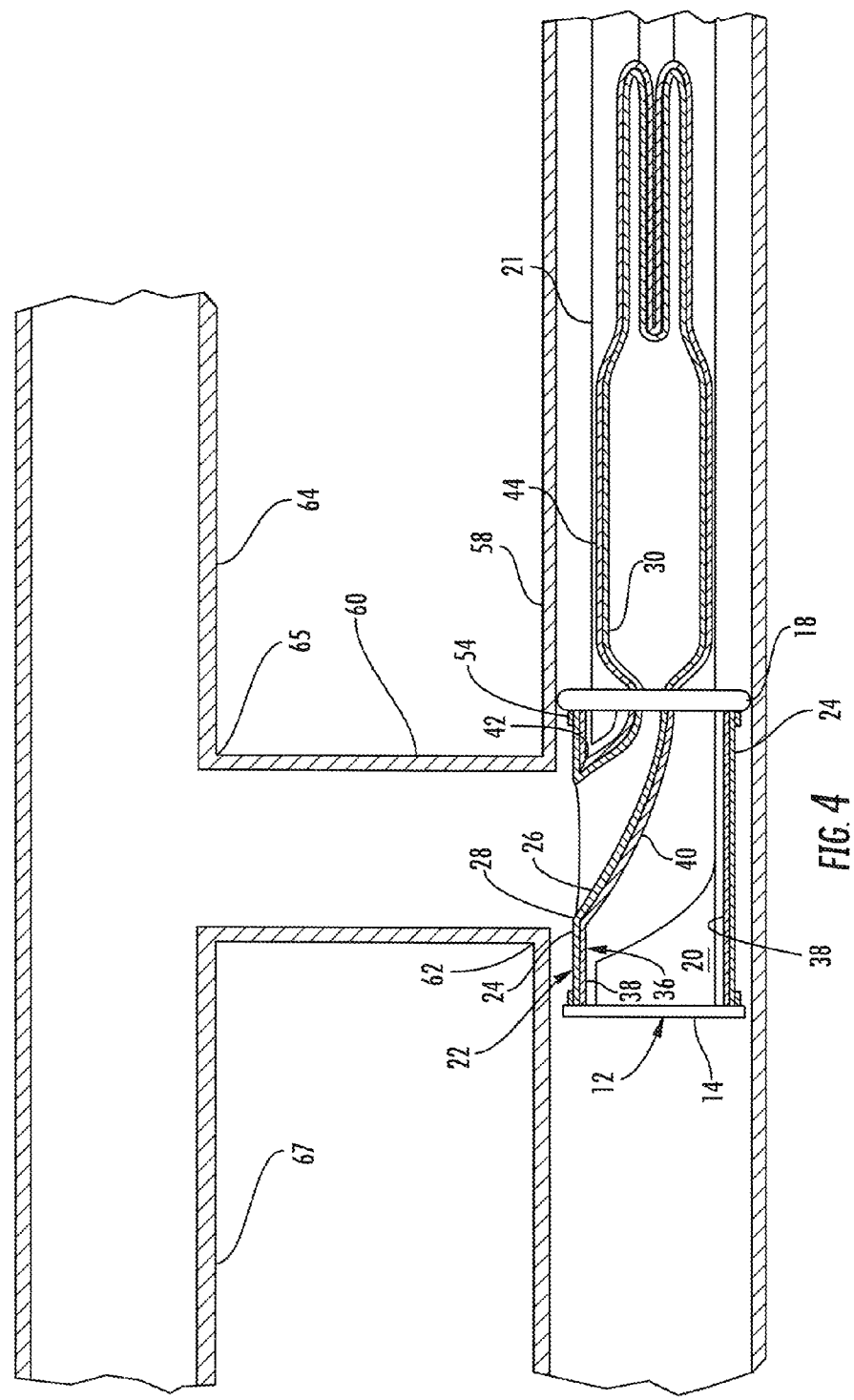
FIG. 4 is a sectional view of the repair assembly being positioned in a pipe system needing repair.
Figure 5:
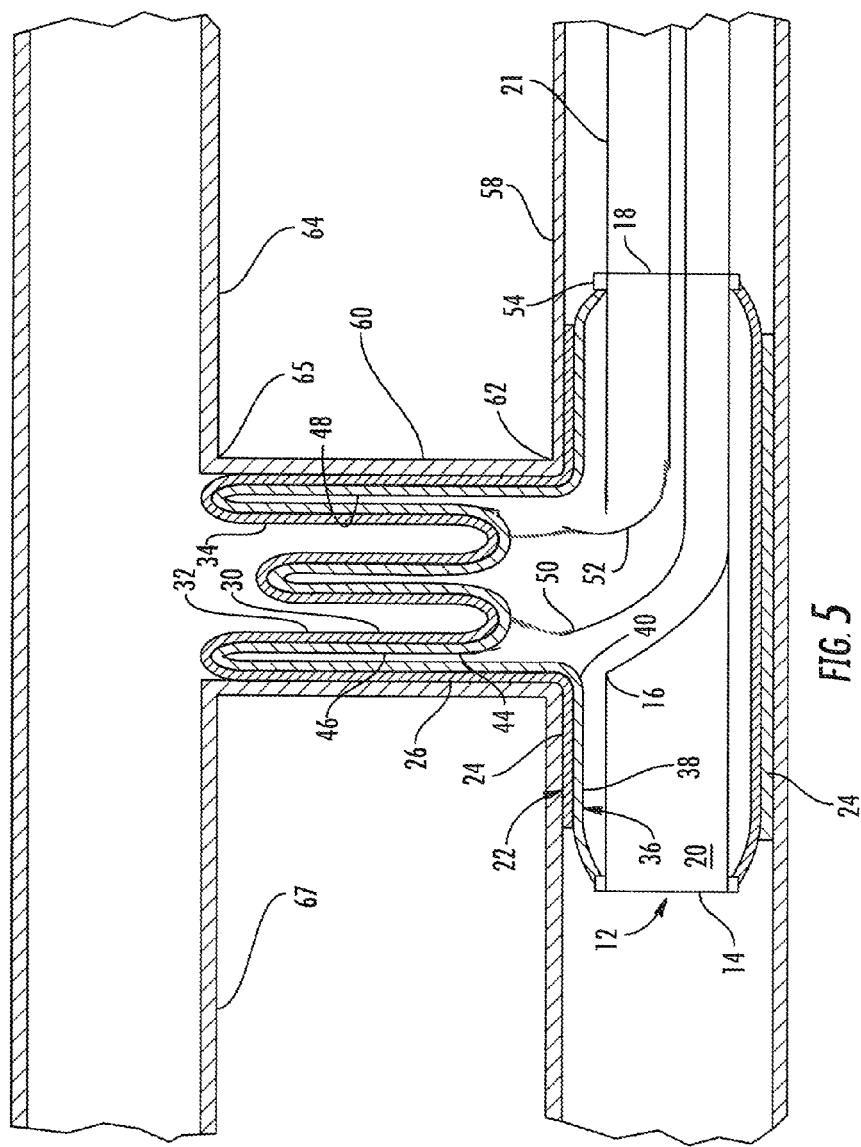
FIG. 5 is a view similar to FIG. 4, with the repair assembly being further positioned in the pipes of the system.
Figure 6:
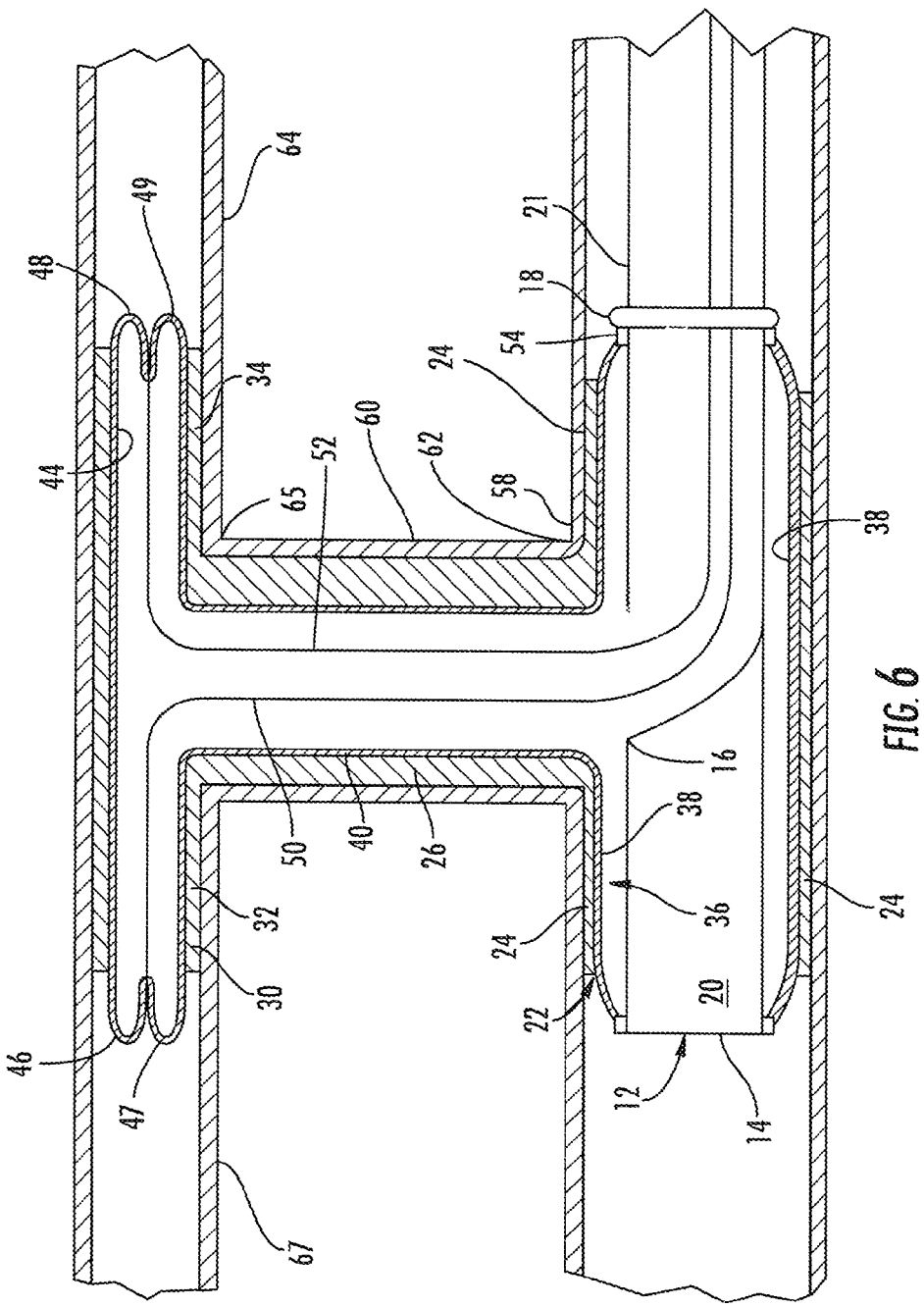
FIG. 6 is a view of the repair assembly fully positioned in the pipe system.

It should further be appreciated that additional measurements can be taken by the system. Diameters of pipes, angles of junctures, length of damaged sections, etc. can also be obtained by the measuring device so that the repair assembly can be prepared accordingly. FIGS. 4-6 illustrate the apparatus and method of a repair assembly 10 being positioned and repairing a pipe system 56 as shown in FIG. 3. The repair assembly 10 includes the components disclosed above regarding FIGS. 1 and 2. The liner assembly 22 is impregnated with a resin capable of curing and hardening. To impregnate the liner, a slug of resin is mixed and poured into an open end of the liner assembly, while the other ends of the liner assembly 22 are temporarily closed or possibly attached to a vacuum pump to remove air from the liner. A slug, roller, or other device is used to press the liner into the shape of a lay flat hose and push or move the slug of resin through the components of the liner assembly 22 such that the material capable of curing and hardening is absorbed by the resin absorbent material of the liner assembly 22. The material capable of curing and hardening may be a two-part resin, heat curable resin, light curable resin, such as a UV light curing resin, or may be a resin including other initiators, which when initiated cause the resin to cure and harden. For example, other such initiators may include chemicals such as catalyst and promoters, steam, hot water, electric, magnetic, resident, sound, or other types of initiators which, when exposed to an initiating device, causes the resin to begin to cure and harden.

Furthermore, it is contemplated that the impregnation of the liner assembly 22 with the material capable of curing and hardening may take place after the liner assembly 22 has been positioned within the components of the bladder assembly 36. For example, the sections of the supplemental liner tube 30 may be positioned in the sections of the supplemental bladder tube 44, the lateral liner tube 26 positioned within the lateral bladder tube 40, and the main liner member 24 positioned adjacent the main bladder tube 38. A first and second closed ends 47, 49 of the supplemental bladder tube 44 are attached to first and second lines 50, 52, which may be ropes, cords, or other connecting members. The combination liner and bladder assembly is then operably connected to the launcher device 12. Such connection may include moving the lateral liner and bladder tubes, as well as the supplemental liner bladder tubes 44 through the launcher device opening 16, through the second end 18 of the launcher device 12, and into and through the lay flat hose 21 extending from the launcher device 12. This may be aided by pulling on the first and second lines 50, 52 attached to the closed ends 47, 49 of the supplemental bladder tube 44. The length of the lateral liner and bladder tubes, as well as the supplemental liner and bladder tubes will be contingent upon the length of the pipes being repaired, and therefore, will generally be configured at a repair of the site to account for the length of pipe needing repaired. Furthermore, the lay flat hose that is connected to the launcher device 12 may be approximately as long as the lateral and supplemental bladder tubes in an elongated position. In a preferred embodiment, the lay flat hose is at least as long as the bladder tubes, when stretched out in an elongated position.

Once the lateral and supplemental liners and bladders have been pulled through the launcher device 12 and lay flat hose 21, the main liner and bladder members are positioned and/or affixed to the launcher device 12. For example, the main bladder tube 38 is generally affixed to the launcher device 12 by banding the ends of the bladder tube by the use of bands 54, which may be tape, clamps, or other securing members. This band and holding the repair assembly into place relative to the launcher device 12 such that expansion of the bladder assembly 36 will not cause the components to move out of position relative to the pipe members of the pipe system. Furthermore, it is contemplated that the main bladder member 38 may be frangibly connected to the launcher device 12 about the launcher device opening 16, such as by snaps, tape, adhesive, and/or hook and loops. Furthermore, it is contemplated that an elastic containment sleeve (not shown) may be positioned between the main bladder tube 38 and the main liner member 24, which further aids in controlling the expansion of the main bladder tube 38. Finally, in addition, it is contemplated that gaskets that take the shape of straps, such as a cured or uncured hydrophilic straps may be positioned at least partially around the main liner member 24 on opposite sides of the main liner member opening 28, or the gasket may take the shape of a flange that is positioned into the lateral pipe and extending around the opening in the main pipe to aid in sealing the repair assembly 10.

Once the repair assembly is fitted, it can be positioned within the main pipe 58. The launcher device 12 may include wheels or other members to aid in moving the assembly 10 through the main pipe 58 and into position such that the launcher device opening 16 is generally adjacent the juncture 62 between the main and lateral pipes 58, 60. In addition, a robot or other moving mechanism may aid in positioning the repair assembly 10 in position in the pipe. A repair assembly is moved into a position shown in FIG. 4.

Once in position, a fluid, such as air, steam, water, or other fluid is introduced into and through the lay flat hose. The fluid continues into and through the launcher device 12. The fluid will cause the bladder assembly 36 to begin to expand. This expansion will first cause the main bladder tube 38 to expand, which presses the main liner member 24 into contact with the main pipe 58. Continued addition of fluid into the repair assembly begins to cause the lateral liner 26 and bladder 40 to evert from the launcher device 12 and into the lateral pipe 60, which is shown generally in FIG. 5. Continued expansion will press the lateral liner tube 26 into contact with the wall of the lateral pipe 60. The eversion of the lateral liner and bladder tubes will continue until the distal end of the lateral pipe 60, which coincides with the introduction of the supplemental pipe 64 at the juncture 65 there between. This is shown in FIGS. 5 and 6.

As shown in FIGS. 5 and 6, the continued addition of fluid into the repair assembly 10 will cause the supplemental bladder 44 to continue expanding, which will cause the first and second sections 46, 48 of the supplemental bladder 44 to extend into first and second sections of the supplemental pipe 64. As shown in FIG. 6, these sections extend generally in opposite directions from the distal end of the lateral pipe 60. The continued eversion and expansion of the supplemental bladder 44 is due to the closed ends of the first and second sections 46, 48. In addition, this continued expansion of the supplemental bladder 44 will cause the first and second sections 32, 34 of the supplemental liner tube 30 to evert into opposite directions of the supplemental pipe 64. Further expansion will press the supplemental liner 30, which include sections 32, 34, into contact with the supplemental pipe 64. Thus, as shown in FIG. 6, the components of the repair assembly 10 have been fully everted into contact with the walls of the corresponding pipes. The pressure within the bladder assembly is maintained until such time as the material impregnated into the components of the liner assembly 22 has cured and hardened. The curing and hardening time of the material may be decreased by the inclusion of initiators, such as heat, light, UV light, electricity, magnetism, or other initiator, which causes the material to begin to cure and harden quicker, i.e., in a shorter amount of time. For example, when using steam, the steam may be passed through the bladder assembly such that it exits at the closed, distal end of the sections 46, 48 of the supplemental bladder 44. Once the material has cured and hardened, the pipe is in a near final repaired configuration.

After the material has cured and hardened with the liner assembly positioned against the walls of the pipe system, the components of the bladder assembly may be removed from the pipe system. The first and second lines 50, 52, attached to the first and second closed ends 47, 49 of the supplemental bladder tube 44 may be pulled to begin to re-evert the components of the bladder assembly into one another and through the supplemental pipe, lateral pipe, and main pipe. The pulling of the lines 50, 52 will cause the bladder to become pealed from the interior of the components of the liner assembly 22.

Figure 7:
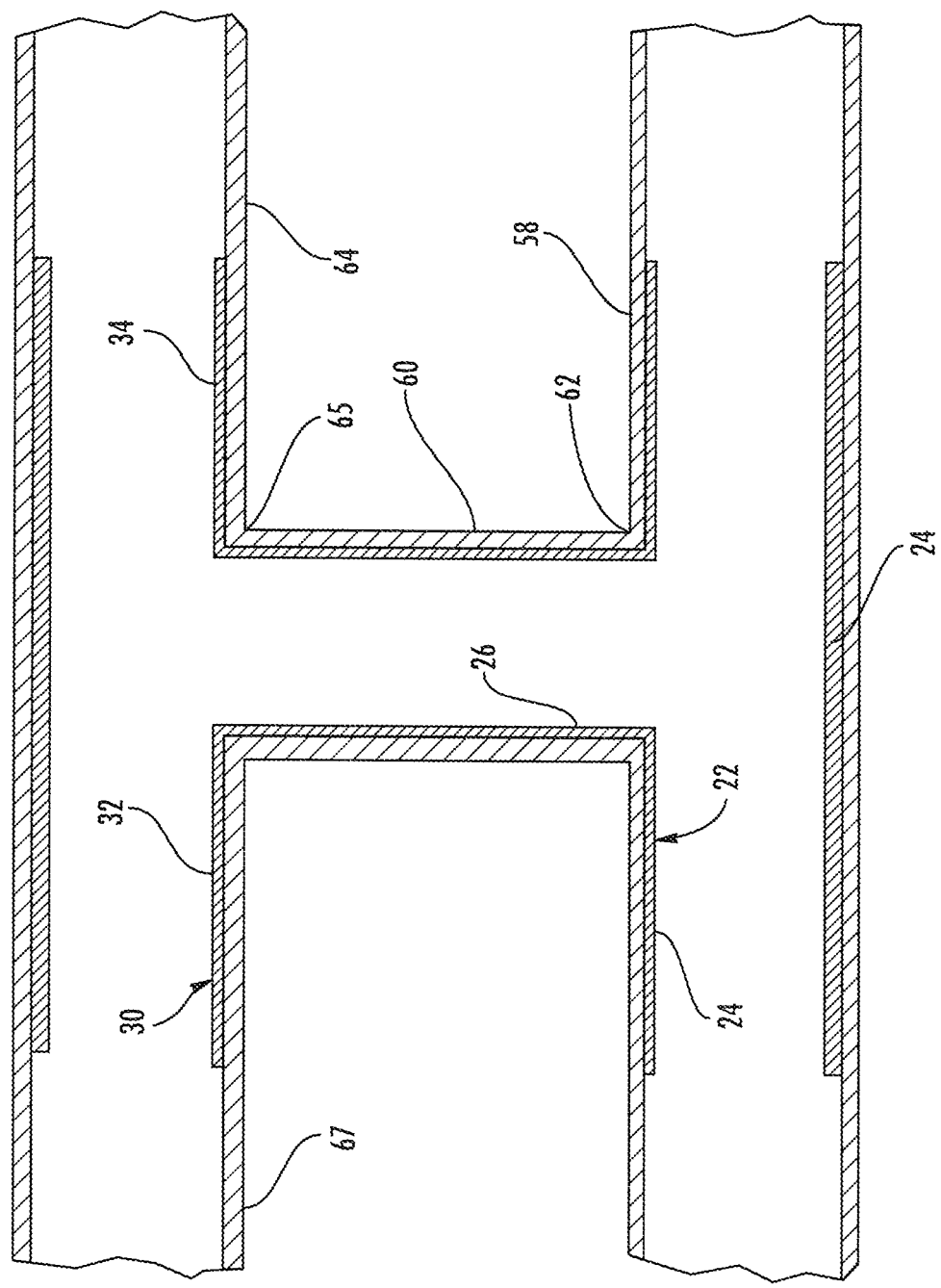
FIG. 7 is a view of the pipe system with repaired walls.

Thus, the pulling of the lines makes it easier for the bladder to be removed through the liner assembly and repaired pipe walls. Once the supplemental bladder tube 44 and lateral bladder tube 40 have been pulled back within and through the launcher device 12 and lay flat hose 21, the launcher device 12 and bladder assembly 36 may be removed from the pipe system. It should be noted that the removal of the bladder system may be accomplished after the fluid has been released from within the bladder assembly to contract the components of the bladder assembly. Once the bladder assembly and launcher device have been removed from the pipe assembly, the repaired pipe may take the form as shown in FIG. 7, in which the components of the liner assembly 22 are remained in the pipe system to form the new walls of the components of the pipe system.

However, the invention further contemplates that the bladder assembly remain in the pipe once the liner assembly has cured and hardened. For example, once the liner assembly has cured and hardened, the closed ends 47, 49 of the supplemental bladder 44 may be cut open to reintroduce access to the supplemental pipe. The lines 50, 52 and launcher device may be removed from the pipe system, thus restoring access through the pipes. In such a configuration, the bladder will bond with the resin and form the new interior walls of the new cured-in-place pipes, thus remaining part of the repaired pipe system. In such configurations, the bladder may include mechanical projections or other chemical means for attaching the bladders to the liners, to aid in keeping the bladders attached to the interior of the liners.

It should be appreciated that the invention includes the omission of the launcher device 12. Instead, the components of the system can be inserted into, and then inverted out of only a lay flat hose. Utilizing such a system would allow the components to be inverted into position in the respective pipes through the lay flat hose.

Figure 8:
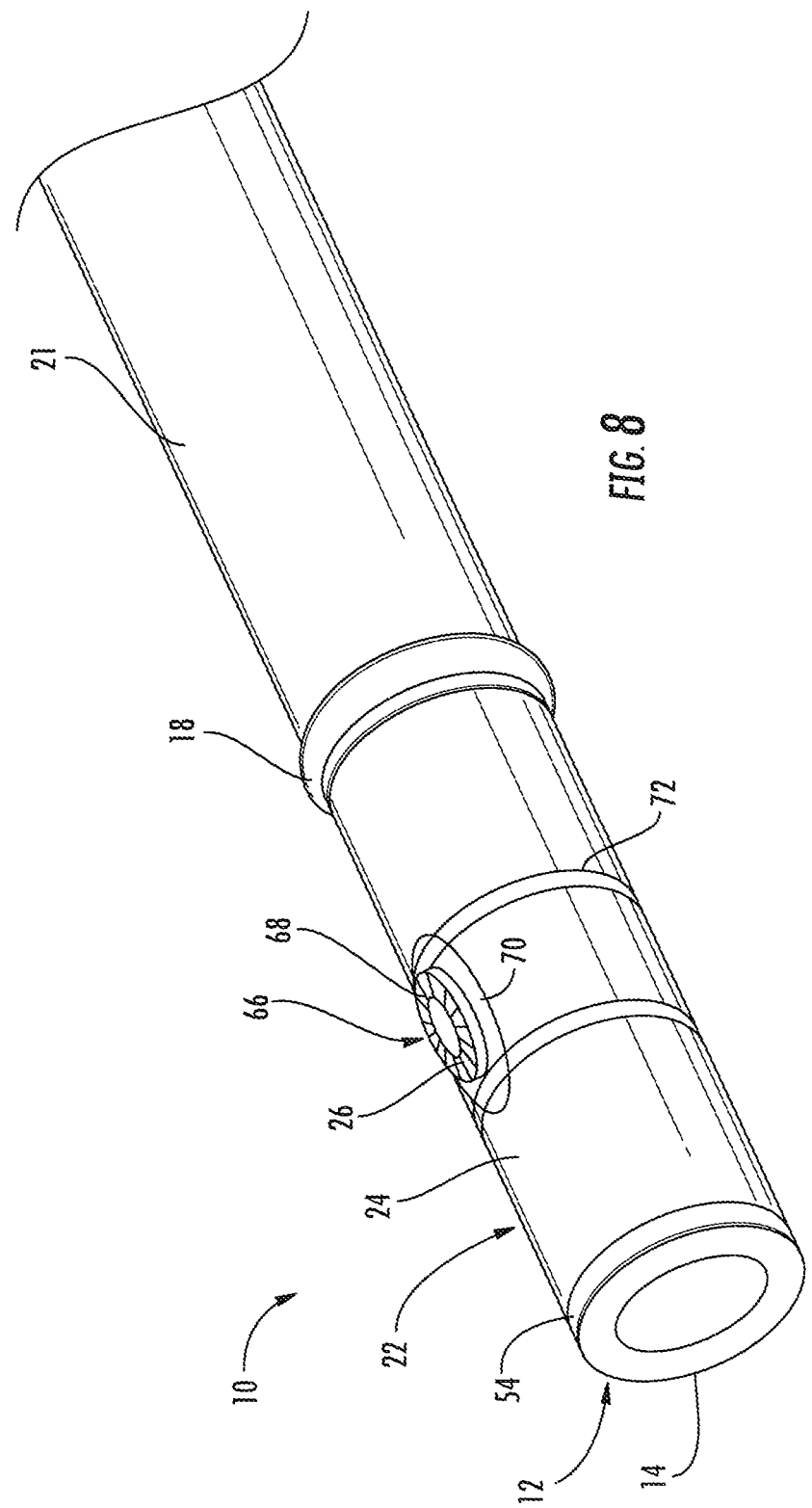
FIG. 8 is a sectional view of another embodiment of a repair system being positioned in a pipe system.
Figure 9:
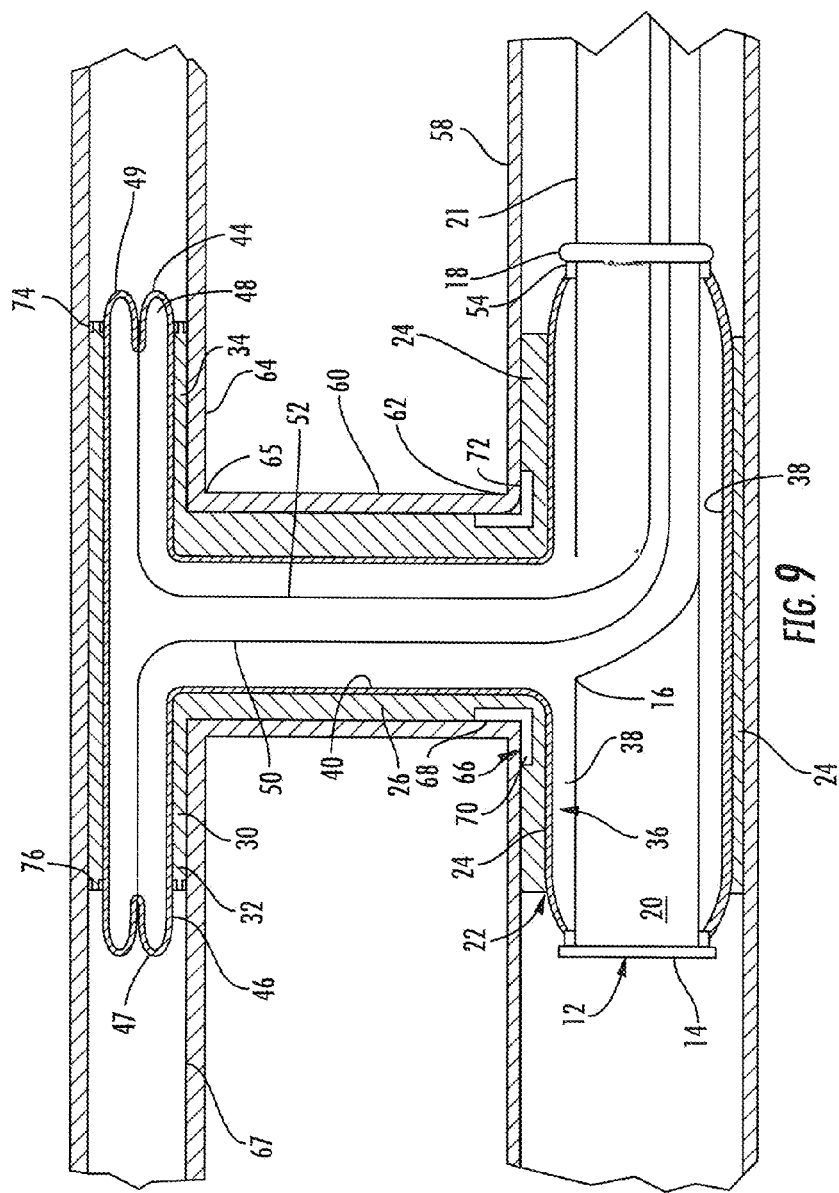
FIG. 9 is a view similar to FIG. 8, but with the repair assembly positioned in the pipes of the pipe system.
Figure 10:
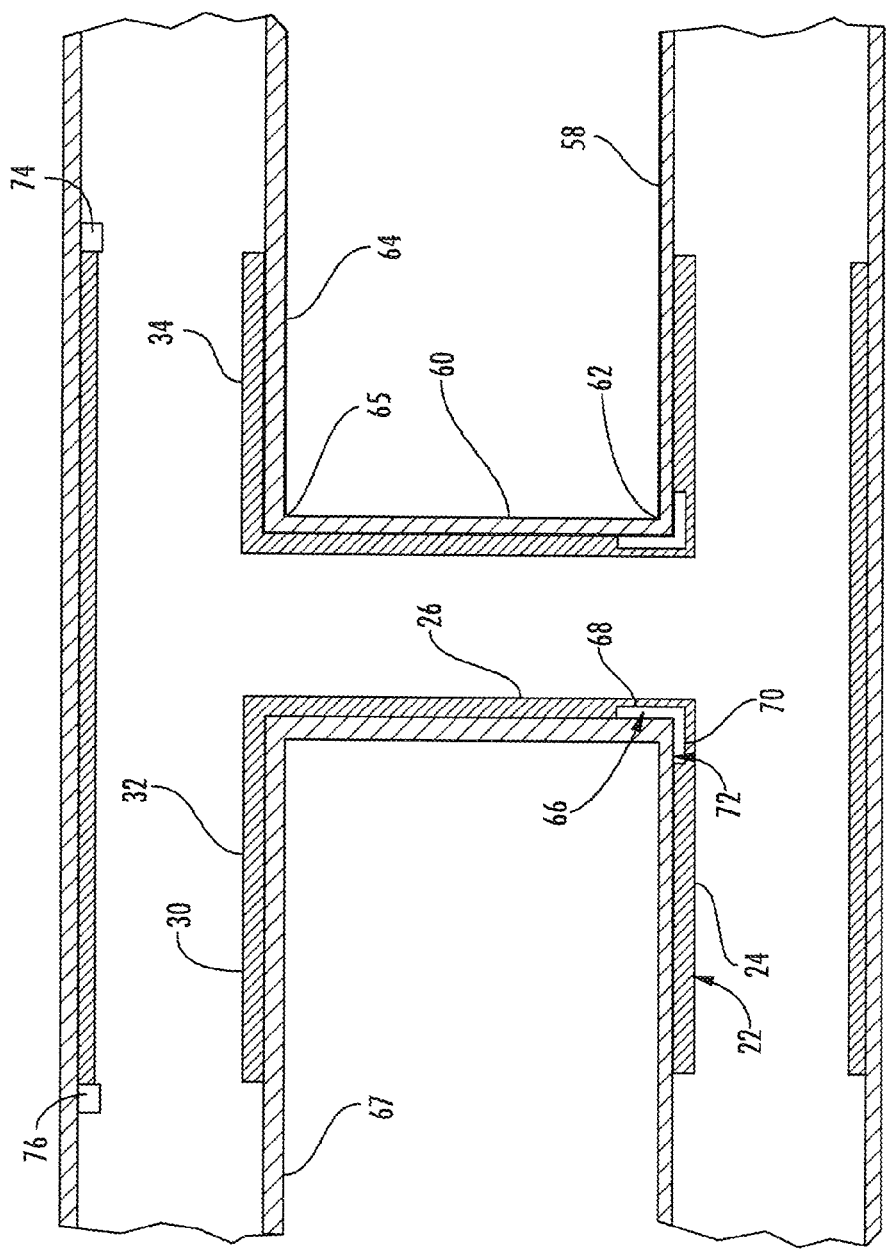
FIG. 10 is a sectional view of the pipe system of FIG. 8 with repaired walls.

FIGS. 8-10 disclose additional embodiments of the repair assembly 10 for repairing pipe systems as shown and described. The repair assembly 10 shown in the figures is similar to that as shown and described with regard to the previous figures. In addition, the repair assembly 10 includes the use of one or more collars 66 for repairing and sealing the juncture 62, 65 between the pipes. As shown in FIG. 8, a collar 66 may be positioned at the launcher device opening 16 and at least partially surrounding the main liner member 24. The collar 66 may comprise an absorbent material or a nonabsorbent material. When the collar 66 comprises an absorbent material, the collar may be impregnated with a material capable of sealing the juncture from external or outside fluids. Thus, a hydrophilic or hydrophobic material may be impregnated into the absorbing collars. However, the collars may otherwise take the form or comprise a hydrophilic or hydrophobic material in a nonabsorbent configuration. For example, the collar 66 may comprise a neoprene or other rubber, which may or may not be compressible and/or impermeable. The collar is used to prevent liquids or other fluids from penetrating the junctures of the pipe systems, which can cause weakening and/or damage to the repaired pipe by introducing liquids or other fluids between the pipe walls and the cured liners of the repair assembly 10.

Thus, as shown in FIG. 8, the collar 66 may be positioned on the liner assembly and launcher device 12. One or more straps 72 may be included to aid in holding the collar 66 in place. Furthermore, the straps 72 may not be required, and instead the collar be frangibly connected to the main liner member 24, such as by snaps, adhesives, stitching, hook and loops, or other manners. The other components of the repair assembly 10 may remain as previously shown and described.

As shown in FIG. 9, the repair assembly 10 including the collar 66 is positioned in the main pipe, and a fluid is introduced into and through the lay flat hose 21 and launcher device 12, which causes the components of the bladder assembly 36 to begin to expand. The expansion will press the main liner member 24 and brim portion 70 of the collar into contact with the main pipe 58. The eversion of the lateral liner into the lateral pipe will cause a tubular portion 68 of collar 66 to contact a portion of the lateral pipe 60. This positions the collar 66 at the juncture 62 between the main and lateral pipes 58, 60 such that the collar provides sealing there at.

Further introduction of a fluid will cause the supplemental liner and bladder to be everted into the first and second sections of the supplemental pipe 64. The eversion will continue until the closed ends 47, 49 of the supplemental bladder tube 44 have reached their end. The bladder will also position first and second end seal straps 74, 76, which are positioned at or near the distal ends of the sections 32, 34 of the supplemental liner 30 and between the liner and the wall of the pipes. The end seal straps may comprise cured or uncured hydrophilic material, or other materials that will aid in preventing water or other liquids from passing behind the liner walls. Thus, other materials, such as compressible and/or impermeable rubbers, may also be used as the end seal straps. The expansion of the bladder assembly 36 is maintained until the material impregnated into the liner assembly 22 has cured and hardened within the pipe system. At this time, the bladder assembly may be removed, leaving the pipe system as shown in FIG. 10. Thus, the liner assembly 22 and the collar 66 may be remained within the pipe system, providing a repaired interior wall of the pipe system, with a sealing member positioned at the juncture 62 between the main and lateral pipes 58, 60.

Furthermore, it is contemplated that another collar, such as one made from cured or uncured materials with paste-like consistency, be positioned in the repair assembly such that it will coincide with the juncture 65 between the lateral pipe 60 and the supplemental pipe 64. In such a situation, the pipe system should be measured such that a known distance or length of lateral pipe is included. At the transition from the lateral liner tube 26 to the supplemental liner tube 30, a second collar may be included and attached thereto. The collar may be attached via a frangible means, such as stitching, adhesive, snaps, hook and loops, or the like. The second collar (not shown) may be generally surrounding the liners such that the eversion of the liners by the expansion of the bladders will cause the collar to be positioned with a portion in the supplemental pipe and a portion in the lateral pipe at the pipe juncture 65. Such a collar would provide sealing from liquids or other fluids at said pipe juncture, which would aid in protecting the repaired walls of the pipe system.

The repair assembly 10 of the invention as shown and described provides numerous advantages and benefits. For example, the repair assembly 10 allows for one assembly to be used to repair a pipe system including multiple pipes extending from one another, i.e., main pipe, lateral pipe extending from the main pipe, and a supplemental pipes extending from the lateral pipe. This will reduce the amount of time required to repair such pipe systems and will eliminate the need to repair each pipe individually. This will also reduce the costs for repairing such pipe systems and will allow additional pipes to be repaired in a timely fashion, and provide for a monolithic cured-in-place pipe having uniform pipe walls and outfitted with sealing gaskets that prevent leakage when compared to previous systems. Other advantages include the use of lines attached to the closed ends of the supplemental bladder. As these are the end pieces of the bladder assembly, the removal of the bladder assembly may be accomplished by the pulling of the lines, which will peal the bladder assembly from the liner assembly within the pipe system. Thus, there is no cutting or other robots or tools required to be inserted into the pipe system to reintroduce access to the pipe system by cutting the closed ends of the bladders. The lines will also be useful in controlling the inversion and expansion of the bladder assembly such that the components of the bladder assembly will fully press the components of the liner assembly against the walls of the corresponding pipes being repaired. Other advantages and benefits obvious to those skilled in the art are to be appreciated.

Figure 14:
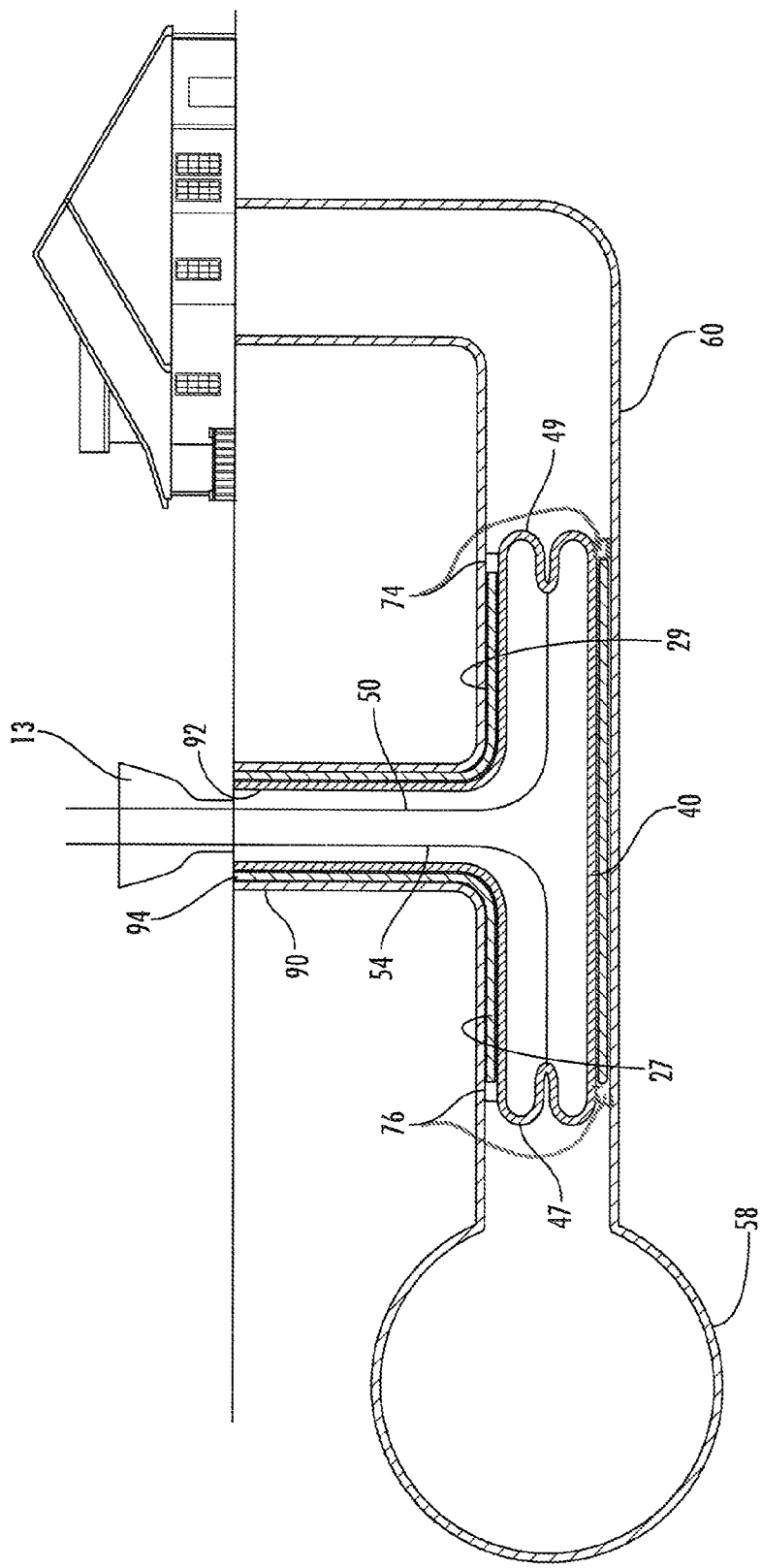
FIG. 14 is a sectional view of another embodiment of a repair assembly for lining through a clean out to repair at least a portion of the clean out pipe and a connecting pipe.
Figure 15:
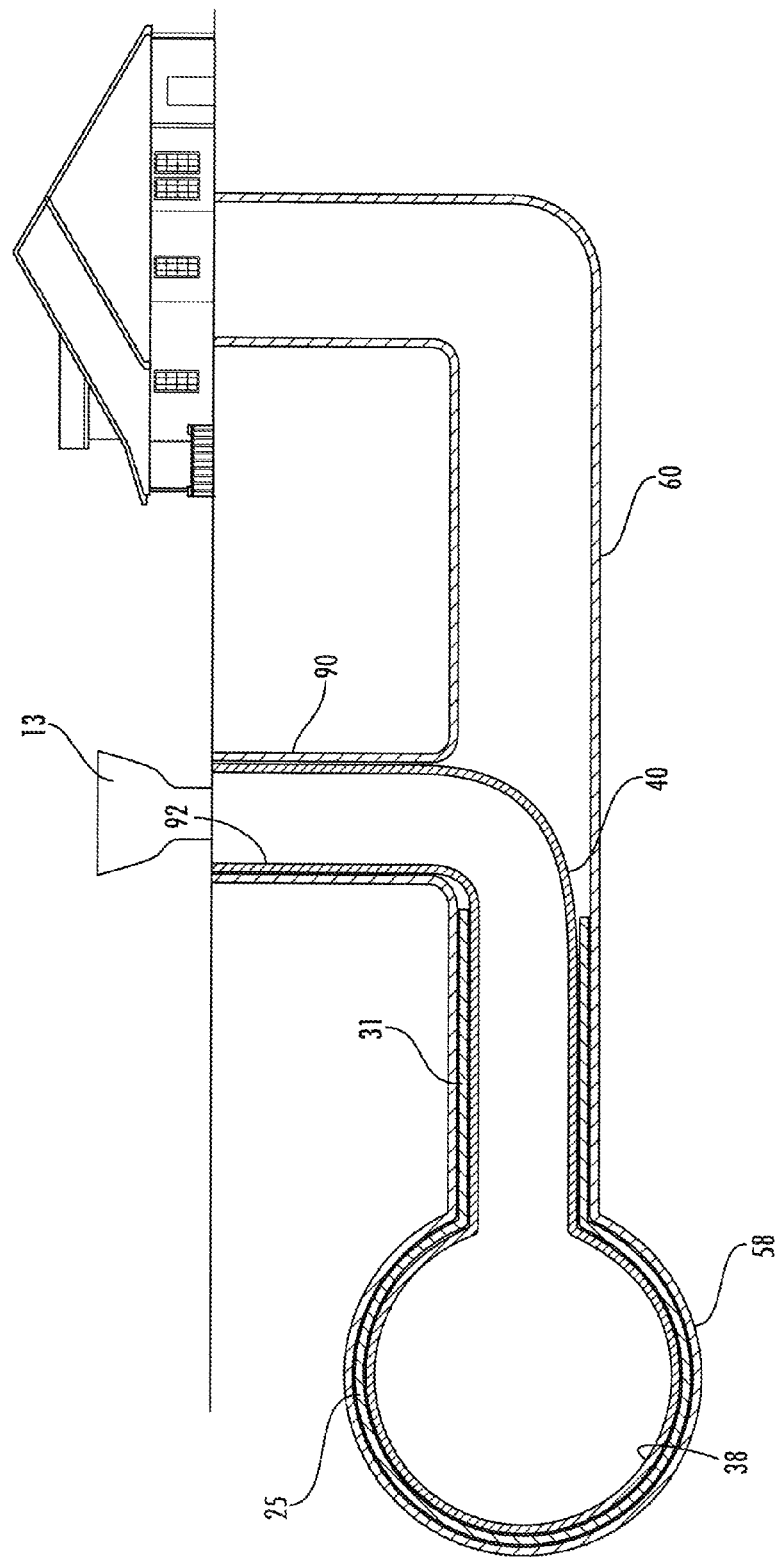
FIG. 15 is a sectional view of another embodiment of a repair assembly for lining through a clean out to repair at least a portion of a lateral pipe and a connecting pipe.
Figure 16:
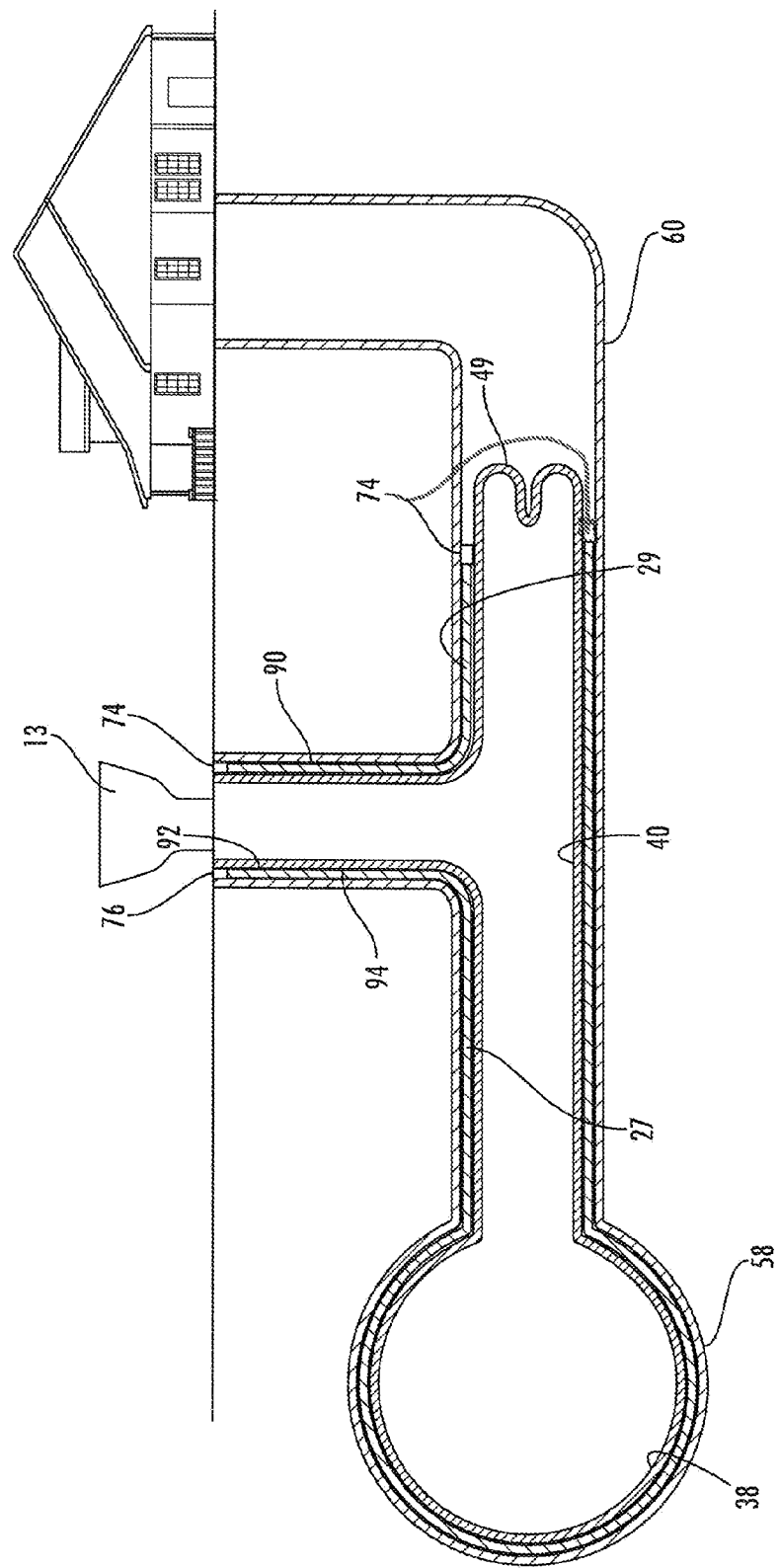
FIG. 16 is a sectional view of another embodiment of a repair assembly for lining through a clean out to repair at least a portion of a lateral pipe and a connecting pipe.

The present invention also includes repair assemblies and pipelining methods to repair multiple pipes using a clean out pipe or access pipe as the point of entry. FIGS. 14-16 show an exemplary pipe system which may be repaired utilizing the repair assembly of the present invention. The pipe system includes a first or access pipe 90. Extending from the first or access pipe 58 is a second or lateral pipe 60. At a distal end of the lateral pipe 60 extends a main pipe 58 or other supplemental pipes. The pipes may be connected at junctions having any suitable geometry, including T or Y configurations. As shown in the figures, the access pipe 90 is connected to a lateral pipe 60 at a T junction such that the lateral pipe 60 extends away from the access pipe 90 in two directions.

The repair assembly shown in FIGS. 14-16 includes a liner assembly and a bladder assembly. These components are constructed and function in a manner similar to the corresponding components in the embodiments described above. The launcher device 13 is positioned near the mouth of the access pipe 90 (typically near ground level and open to the atmosphere) and is adapted to position the liner assembly and bladder assembly downward into the pipe system from the mouth of the access pipe 90. A similar ground-level launcher is described in U.S. Pat. No. 7,343, 937 (Kiest, Jr.) which is hereby incorporated by this reference. The liner and bladder assemblies are similar to those described above except that in these embodiments the inversion starts down the mouth of the access pipe 90 instead of in the main pipe 58 or up the lateral pipe 60. Thus, in these embodiments the inversion terminates at the closed ends 47, 49 of the bladder assembly in the lateral pipe 60 (FIG. 14), main pipe 58 (FIGS. 15 and 16), or other supplemental pipe. Additionally, the liner and bladder assemblies in FIGS. 14-16 are not configured to line on opposite sides of the entry point, as is shown and described in the previous embodiments.

As shown in FIG. 14, the liner assembly includes a access liner 94 configured to line an access pipe 90 and a lateral liner configured to line a lateral pipe 60 extending from the access pipe 90. The lateral liner has a first portion 27 and a second portion 29. The first portion 27 of the lateral liner is adapted to extend in the lateral pipe 60 in a first direction away from the access pipe 90 and the second portion 29 of the lateral liner is adapted to extend in the lateral pipe 60 in a second direction away from the access pipe 90. The different sections of the liner assembly 94, 27, and 29 may be combined in a tee or wye shape configuration at each respective pipe junction to allow the liner assembly to repair the pipe system in which the pipe junctions are at a tee or wye angle from each other. As described in other embodiments, bladders may be used to press the liner assembly into contact with the pipes. In the embodiment shown in FIG. 14, the bladder assembly includes a access bladder 92 combined with a lateral bladder 40. The lateral bladder 40 includes a first portion and a second portion configured to extend away from the access pipe 90 in different directions as described above for the liner assembly.

The length of the access pipe 90, e.g., the distance between the mouth of the access pipe 90 and the lateral/access pipe juncture can be measured in order to prepare the repair assembly for use in a particular pipe system. The measurements are important to ensure the proper length of liner and bladder segments are prepared and aligned with respect to each other before insertion into the pipe system. Pipe measurements can be done in many ways and will provide an assembly in which the lateral pipe liners 27, 29 begin to extend from the access liner 94 at approximately the location of the juncture. Some apparatus and methods for obtaining pipe measurements are shown and described above with respect to FIGS. 11-13.

FIG. 14 shows the repair assembly fully inverted similar to the inversion stage shown in FIGS. 6 and 9 for other embodiments described herein. The expansion of the bladder assembly, curing of the liner assembly, and optional removal of the bladder assembly are performed for the embodiment shown in FIG. 14 in a manner similar to the corresponding processes described above, except the entry/exit point and launcher device 13 are located at the ground level of the access pipe 90 instead of within the main pipe 58. The other features described with respect to earlier embodiments, such as the use of a collar, may also be used with the embodiment shown in FIG. 14.

FIG. 15 shows an embodiment similar the embodiment described with respect to FIG. 14 except there is no liner tube in the access pipe 90 after the repair assembly is inverted into the pipe system. This allows the lateral pipe 60 to be repaired in only one direction away from the access pipe 90 without needing the liner tube to be cut after instillation to allow the sewage to pass from the house. In this embodiment, it is important to position the lateral liner tube 31 within the bladder tubes 40, 92 to ensure that the lateral liner tube 31 does not begin to invert until after the bladder assembly reaches the lateral pipe 60. The length of the access pipe 90 must be determined as described above. The position of the lateral liner tube 31 within the bladder tubes 92, 40 may be determined by the method described in U.S. Pat. No. 7,343,937, which is incorporated by this reference. The means of frangibly attaching the liner and bladder is also described in U.S. Pat. No. 7,343,937.

The liner assembly for the embodiment shown in FIG. 15 includes a lateral liner tube 31 configured to line a lateral pipe 60 and a main liner tube 25 configured to line a second or main pipe 58 extending from the lateral pipe 60. The main liner tube 25 may extend from the lateral pipe 60 in one or more directions. In one embodiment, the main liner tube 25 has a first portion and a second portion. The first portion of the main liner tube 25 is adapted to extend in the main pipe 56 in a first direction away from the lateral pipe 60 and the second portion of the main liner tube 25 is adapted to extend in the main pipe 58 in a second direction away from the lateral pipe 60. The bladder assembly includes an access bladder tube 92 combined with a lateral bladder tube 40 combined with a main bladder tube 38. The main bladder tube 38 may extend from the lateral pipe 60 in one or more directions to correspond with the main liner tube 25. FIG. 15 shows the liner assembly after inversion of the bladder tubes 40, 92, 38 and liner tubes 31, 25. The expansion of the bladder assembly, curing of the liner assembly, and optional removal of the bladder assembly are performed for the embodiment shown in FIG. 15 in a manner similar to the corresponding processes described above, except the entry/exit point and launcher device 13 are located at the ground level of the access pipe 90 instead of within the main pipe 58. The other features described with respect to earlier embodiments, such as the use of a collar, may also be used with the embodiment shown in FIG. 15.

The repair assembly and lining process illustrated in FIG. 15 does not line a portion of the access pipe 90. Alternatively, the access pipe 90 can also be lined in this embodiment as shown in FIG. 14.

FIG. 16 shows an embodiment similar to the one shown in FIG. 14. In this embodiment, however, the liner assembly further comprises a main liner tube 25 combined with the lateral liner first portion 27 configured to line a third or main pipe 58. The main liner tube 25 may extend from the lateral pipe 60 in one or more directions. In one embodiment, the main liner tube 25 has a first portion and a second portion. The first portion of the main liner tube is adapted to extend in the main pipe 56 in a first direction away from the lateral pipe 60 and the second portion of the main liner tube is adapted to extend in the main pipe 58 in a second direction away from the lateral pipe 60. The bladder assembly further comprises a main bladder tube 38 combined with the lateral bladder 40. The main bladder tube 38 may extend from the lateral pipe 60 in one or more directions to correspond with the main liner tube 25.

FIG. 16 shows the repair assembly in the process of inverting the liner assembly and bladder assembly downward from the access pipe 90 into the lateral pipe 60. This is similar to the inversion stage shown in FIGS. 6 and 9 for other embodiments described herein. The expansion of the bladder assembly, curing of the liner assembly, and optional removal of the bladder assembly are performed for the embodiment shown in FIG. 16 in a manner similar to the corresponding processes described above, except the entry/exit point and launcher device 13 are located at the ground level of the access pipe 90 instead of within the main pipe 58. The other features described with respect to earlier embodiments, such as the use of a collar, may also be used with the embodiment shown in FIG. 16.

It should be understood that additional changes and modifications to the embodiments shown and described herein will be apparent to those skilled in the art. Such changes and modifications may be made without departing from the spirit and scope of the invention, and without diminishing its advantages. It is intended, therefore, that such change and modifications be covered by the various aspects and embodiments of the invention.

The invention claimed is:

1. A liner assembly, comprising:
a main liner member;
a lateral liner tube extending from and in fluid communication with the main liner member, wherein the lateral liner tube is configured to line at least a portion of a lateral pipe extending from a main pipe at a first pipe juncture; and
at least one supplemental liner tube extending from and in fluid communication with the lateral liner tube, wherein the supplemental liner tube is configured to line at least a portion of a supplemental pipe extending from the lateral pipe at a second pipe juncture in a first direction and a second direction, and wherein the at least one supplemental liner tube extends from the lateral liner tube in the first direction and the second direction;
wherein the main liner member, the lateral liner tube, and the at least one supplemental liner tube form a monolithic liner assembly.

2. The liner assembly of claim 1 wherein the at least one supplemental liner tube comprises first and second supplemental sections extending from the lateral liner.

3. The liner assembly of claim 2 wherein the first and second sections of the supplemental liner tubes extend from a distal end of the lateral liner tube.

4. The liner assembly of claim 1 wherein the main liner member, lateral liner, and at least one supplemental liner comprise a resin absorbent material.

5. The liner assembly of claim 1 wherein the lateral line tube is configured to be inverted from at least partially within the main liner member to a position outside of the main liner member.

6. The liner assembly of claim 5 wherein the at least one supplemental liner tube is configured to be inverted from at least partially within the lateral liner tube to a position outside of the lateral liner tube.

7. The liner assembly of claim 1 wherein the main liner member is a preformed tube having connected abutting edges.

8. The liner assembly of claim 1 wherein the main member is a flat sheet having opposite edges formed into a tube by overlapping the opposite edges.

9. The assembly of claim 1 wherein the lateral line tube has a diameter different from a diameter of the supplemental liner tube.

10. The assembly of claim 1 wherein the main liner member has a first diameter, the lateral line tube has a second diameter, and the supplemental liner tube has a third diameter, and wherein each of the first, second, and third diameters is different.

11. The assembly of claim 1 wherein the main liner member and the lateral liner tube are substantially perpendicular.

12. The assembly of claim 1 wherein the lateral liner tube and the supplemental liner tube are substantially perpendicular.

13. A method of repairing a pipe, comprising:
providing a liner assembly comprising a main liner member, a lateral liner tube extending from the main liner member, and at least one supplemental liner tube extending from the lateral liner tube in a first direction and a second direction and configured to line at least a portion of a supplemental pipe extending from a lateral pipe;
impregnating the liner assembly with a material capable of curing and hardening;
inverting and expanding the liner assembly in a pipe system such that the lateral liner tube extends into and in contact with a lateral pipe which extends from a main pipe at a first pipe juncture and such that the at least one supplemental liner tube extends into and in contact with the supplemental pipe which extends from the lateral pipe at a second pipe juncture in the first direction and the second direction; and
allowing the material to cure and harden.

14. The method of claim 13 further comprising providing a bladder assembly comprising a main bladder tube, a lateral bladder tube extending from the main bladder tube, and at least one supplement bladder tube extending from the lateral bladder tube.

15. The method of claim 14 further comprising expanding the bladder assembly such that the main bladder tube expands to expand the main liner member into contact with the main pipe, the lateral bladder tube expands to position the lateral liner tube in and into contact with the lateral pipe, and the at least one supplemental bladder tube expands to position the at least one supplemental liner tube into position within and in contact with the supplemental pipe.

16. The method of claim 15 further comprising removing the bladder assembly after the material has cured and hardened.

17. The method of claim 15 wherein the first section of the supplemental liner tube is positioned within and into contact with a first section of the supplemental pipe and the second section of the liner tube is positioned within and into contact with a second section of the supplemental pipe.

18. The method of claim 13 wherein the at least one supplemental liner tube comprises first and second sections.

19. The method of claim 13 wherein the lateral and the at least one supplemental liner tubes are positioned by inverting the liners into the lateral pipe and the supplemental pipe.

20. A repair assembly, comprising:
a bladder assembly comprising a main bladder tube, a lateral bladder tube extending from the main bladder tube, and at least one supplement bladder tube extending from the lateral bladder tube; and
a monolithic liner assembly comprising a main liner member, a lateral liner tube extending from and in fluid communication with the main liner member, and at least one supplemental liner tube extending from the lateral liner tube in a first direction and a second direction and in fluid communication with the lateral liner tube;
wherein the lateral liner tube is configured to line at least a portion of a lateral pipe extending from a main pipe at a first pipe juncture and the supplemental liner tube is configured to line at least a portion of a supplemental pipe extending from the lateral pipe in the first direction and the second direction at a second pipe juncture;
wherein the main liner member at least partially surrounds the main bladder member, the lateral liner tube is configured to be positioned between the lateral bladder tube and the lateral pipe, and the at least one supplemental liner tube is configured to be positioned between the at least one supplemental bladder tube and the supplemental pipe; and
wherein at least a portion of the liner assembly comprises a resin absorbent material.

21. The repair assembly of claim 20 further comprising a launcher device, wherein the main bladder member at least partially surrounds the launcher device and the launcher device is used to position the repair assembly.

22. The repair assembly of claim 21 wherein the launcher device is fluidly connected to the bladder assembly such that the launcher device provides a fluid to the bladder assembly to inflate and expand said bladder assembly to expand the liner assembly.

23. The repair assembly of claim 20 further comprising a collar positioned at a juncture of the main liner member and the lateral liner tube such that the collar is configured to be located at least partially between the main liner member and a main pipe.

24. The repair assembly of claim 23 wherein the collar comprises a hydrophilic material.

25. The repair assembly of claim 23 wherein the supplemental liner has distal ends and the repair assembly further comprises end seals positioned near the distal ends of the supplemental liner.

26. The repair assembly of claim 20 wherein the at least one supplemental liner tube comprises first and second sections of the supplemental liner tube extending from a distal end of the lateral liner tube.

\* \* \* \* \*